United States Patent [19]

Mick

[11] Patent Number: 5,655,615
[45] Date of Patent: Aug. 12, 1997

[54] WHEELED VEHICLE FOR DISTRIBUTING AGRICULTURAL MATERIALS IN FIELDS HAVING UNEVEN TERRAIN

[76] Inventor: Jeffrey Mick, 9304 Hess Rd., Edwardsville, Ill. 62025

[21] Appl. No.: 729,714

[22] Filed: Oct. 7, 1996

Related U.S. Application Data

[63] Continuation-in-part of Ser. No. 177,932, Jan. 6, 1994, Pat. No. 5,562,172.
[51] Int. Cl.$^6$ .................................................. B62D 61/10
[52] U.S. Cl. ........................ 180/24.02; 280/5.2; 280/677
[58] Field of Search ...................... 180/24.02; 280/5.2, 280/677, 5.32, 688, 204, 679, 789

[56] References Cited

U.S. PATENT DOCUMENTS

| | | | |
|---|---|---|---|
| 1,857,343 | 5/1932 | Amington et al. | 280/677 |
| 4,056,158 | 11/1977 | Ross | 140/24.02 |
| 4,397,473 | 8/1983 | Miles et al. | 280/683 |
| 4,709,773 | 12/1987 | Clement et al. | 180/9.32 |
| 4,840,394 | 6/1989 | Bickler | 280/647 |
| 4,861,065 | 8/1989 | Cote | 180/24.02 X |
| 5,163,698 | 11/1992 | Evens | 280/404 |
| 5,246,246 | 9/1993 | Kendall | 280/677 |
| 5,273,296 | 12/1993 | Lepck | 280/5.2 |
| 5,482,326 | 1/1996 | Levi | 280/677 X |

FOREIGN PATENT DOCUMENTS

| | | | |
|---|---|---|---|
| 0955619 | 10/1974 | Canada | 280/677 |
| 0040103 | 7/1965 | Germany | 280/677 |
| 1952821 | 4/1971 | Germany | 280/677 |
| 2025225 | 12/1971 | Germany | 280/677 |
| 0207706 | 9/1984 | Japan | 180/24.02 |

*Primary Examiner*—Christopher P. Ellis
*Attorney, Agent, or Firm*—Ronald P. Kananen; Jeffrey L. Thompson

[57] ABSTRACT

A vehicle adapted to traverse uneven terrain, comprising a chassis and a plurality of wheel assemblies. The wheel assemblies each comprise a forward wheel and a rear wheel mounted on a common support structure. The support structure is supported for free pivotal movement on the chassis about a pivot axis located between the forward and rear wheels and is constructed and arranged such that the forward wheel of each wheel assembly supports less weight of the vehicle than the rear wheel of the respective wheel assembly. A stopper arrangement, which can take a variety of forms, is provided for limiting the pivotal movement of the support structures of each wheel assembly about the pivot axis. The stopper arrangement is adjustable for changing a range of free pivotal movement of the respective support structure. The vehicle can be a towed trailer-type vehicle with a wheel assembly on both sides, or a self-propelled vehicle with a wheel assembly located at each corner of the vehicle. The wheel assemblies can be provided with soft low pressure flotation tires or endless tracks.

30 Claims, 18 Drawing Sheets

WHEELED VEHICLE FOR DISTRIBUTING AGRICULTURAL MATERIALS IN FIELDS HAVING UNEVEN TERRAIN

RELATED APPLICATION

This is a continuation-in-part of applicant's U.S. patent application Ser. No. 08/177,932, filed Jan. 6, 1994, now U.S. Pat. No. 5,562,172.

BACKGROUND OF THE INVENTION

1. Field of the Invention

The present invention relates generally to agricultural vehicles. More specifically, the present invention relates to agricultural vehicles for distributing materials in fields having uneven terrain, which are capable of traversing formations such as levees, wash-outs, and the like.

2. Description of the Relevant Art

It is a common practice to spray agricultural fields using aircraft, especially those fields having uneven terrain. For example, most chemical application on rice is carried out by aircraft. However, this practice suffers from a number of drawbacks. The aerial spraying technique tends to be expensive and suffers from target spray drift, which tends to be a major source of environmental problems. Further, timely aerial application can be a problem because crop dusting aircraft cannot operate in high winds. Additionally, it is difficult to spray irregularly shaped fields using aircraft.

Conventional ground application spray rigs encounter difficulties in crossing rice levees, wash-outs, and other surface irregularities, especially conventional tractors, trucks, trailer sprayers, and self-propelled sprayers that use high pressure tires. These tires exhibit little or no flexure and apply a high force per unit area to the surface under the tire. This tends to crush and flatten freshly pulled or plowed levees and necessitates manual repair, using a hand shovel or the like, of the ruts created by the tires.

In addition to the damage to levees, conventional spray equipment has also suffered from a relatively large amount of mechanical breakage. This breakage is due largely to the vertically oriented jolting caused when a levee, wash-out, or other surface irregularity is traversed by the vehicle.

In an effort to overcome the above mentioned problems encountered with aircraft and conventional ground application equipment, and to ensure that timely spraying of agricultural crops and the like could be assuredly carried out irrespective of the ground and wind conditions, the applicant developed an ATV (all terrain vehicle) sprayer which exhibits excellent floatation capability on extremely soft ground.

This arrangement, as shown in FIG. 1, comprised an ATV prime mover and an ATV sprayer vehicle (trailer). Both the ATV prime mover and the trailer used very soft, low pressure elastic tires that exhibit very high flexing and floatation capabilities. The low weight of the ATV prime mover and ATV sprayer vehicle (hereinafter ATV sprayer) produced a low ground pressure and enabled the ATV prime mover and ATV sprayer to roll over soft ground without leaving ruts. This arrangement worked well on level land in corn, wheat and soybeans.

However, the ATV sprayer vehicle in this instance used a conventional tandem axle including a cross-beam bracing arrangement interconnecting the front and back axles and was arranged so that the front and rear axles were spaced equally on either side of the pivot or fulcrum point of the two axles. In other words, the front and rear axles were spaced in a fixed 1:1 relationship with respect to the point intermediate the two axles about which the vehicle tends to tilt.

Several features of this design prevented the ATV sprayer from crossing levees. The first was that the 1:1 axle spacing did not allow the vehicle to readily ascend the uphill face of a levee. Moreover, once on top of the levee, the vehicle chassis tended to straddle the levee and bring about the situation wherein the cross-beams that interconnect the front and rear axles either cut into or dragged across the top of the levee. The damage that resulted from this cutting or dragging action often was so severe as to require someone to use a shovel to manually repair the levee.

Another acute problem that was encountered is illustrated in FIG. 1. As shown in FIG. 1, after the prime mover 10, in this case a four wheel ATV, has crossed the levee or undulation 12, the rigid connection 14 between the ATV (prime mover) and the trailer (ATV sprayer) 16 tended to hold the trailer level, thereby preventing the trailer from assuming a posture conducive to uphill travel. Therefore, the leading wheels 20 were subjected to a force that tended to pull them "straight through" the levee 12 resulting in the generation of a moment of force that was sufficient to lift the rear wheels 22 off the ground in the manner illustrated in FIG. 1, and causing the ATV sprayer 16 to teeter forward.

This collision-like encounter with the front or ascending wall 12a of the levee produced an impact that was undesirably imparted to the spraying apparatus 24 mounted on the trailer 16 (ATV sprayer) and generated sufficient resistance, as the front wheels 20 tended to sink into the relatively soft wall 12a, to keep the ATV sprayer 16 teetering and, in some cases, to cause the ATV prime mover 10 to lose traction.

In addition to the conventional towed agricultural vehicles described above, self-propelled spray vehicles have also been used to apply agricultural materials to fields. These self-propelled vehicles typically have a high clearance chassis to permit application of chemicals, fertilizer, and the like to standing crops. One form of self-propelled vehicle 30 (FIG. 2) is supported by four wheels 31, 32 located at respective corners of the vehicle 30. The wheels 31, 32 are typically each driven by an individual drive mechanism (not shown) so as to provide a four-wheel drive for increasing traction in wet and uneven field conditions. Various types of suspension arrangements are associated with each of the wheels 31, 32 to help absorb jolts and stresses caused by levees, wash-outs, and so forth.

As shown in FIG. 2, the conventional self-propelled vehicle 30 has a significant drawback when operated in uneven terrain as a result of the single-wheel assemblies. For example, when the vehicle traverses a wash-out or ditch 33, as shown in FIG. 2, the front wheels 31 tend to drop suddenly to the bottom of the wash-out or ditch 33 causing a major bump to the vehicle 30 and the suspension components. When the wheel 31 reaches the far side of the wash-out or ditch 33, a second bump is caused as the front wheels 31 impact the side wall of the formation. These impacts can cause major stresses to the vehicle during normal operation over uneven terrain, as well as a reduction in the operator's comfort and in the stability of the spray boom (not shown).

Another conventional self-propelled vehicle 40 uses an endless track support assembly 41, as shown in FIG. 3. The conventional endless track vehicle 40 suffers from a "nose over" tendency when uneven terrain is traversed, such as mounds, levees, wash-outs or ditches. As shown in FIG. 3, this "nose over" tendency can cause a teeter totter effect when, for example, the front end 42 of the vehicle 40 drops into a wash-out or ditch 43. In some cases, this teeter totter effect can cause a portion 44 of the track assembly 41 to lose contact with the field surface, thereby reducing the operator's comfort as well as the stability of the spray boom (not shown). The single track assembly 41 also tends to destroy a substantial amount of standing crops during normal turns in the field.

Another known self-propelled vehicle for traversing uneven terrain is described in German Patent Publication No. 1,952,821. This vehicle includes a two-wheel assembly located at each of the four corners of the vehicle. Each two-wheel assembly comprises two successive wheels rotatably mounted on respective ends of a balancing lever arranged between the wheels. A suspension-like servo arrangement is connected to the balancing lever arrangement between the wheels so that the front wheels can be forced off the ground during normal operation to assume an elevated position. The wheel assemblies are arranged to provide equal weight distribution on both wheels of the assembly. The front wheel of each wheel assembly is substantially smaller than a rear wheel of each wheel assembly. In one embodiment, an endless chain is provided about each of the wheel assemblies to improve traction.

The vehicle described in the German '821 publication suffers from a number of disadvantages. The vehicle is not suitably equipped to traverse steep levees and deep wash-outs without damaging the vehicle or the ground surface, and without sacrificing the operator's comfort. For example, because there is no structure for limiting the pivotal movement of the balancing lever for each wheel assembly, the front wheel will, under some circumstances, tend to drop too far into a wash-out or trough following a levee, thereby causing damage to the vehicle or a substantial jolt to the operator. In addition, the equal weight distribution between the front and rear wheels increases the damage caused to levees, terraces, and other desired field terrain, as well as to standing crops.

SUMMARY OF THE INVENTION

It is an object of the present invention to provide an agricultural vehicle that overcomes the problems associated with the existing vehicles described above.

More specifically, it is an object of the present invention to provide a pivotal tandem axle arrangement for an agricultural vehicle that allows the vehicle to traverse surface undulations, such as levees and wash-outs, with relative smoothness and in a manner that reduces damage to the terrain and standing crops, as well as damage to the mechanical components of the vehicle.

It is another object of the present invention to provide a self-propelled agricultural vehicle with an improved tandem axle arrangement at each corner of the vehicle.

It is yet another object of the present invention to provide a self-propelled agricultural vehicle with a freely pivoting tandem axle assembly at each corner of the vehicle in which a front wheel of each tandem axle assembly carries less weight of the vehicle than a rear wheel of the respective axle assembly, and in which a means for limiting the pivotal movement of each axle assembly is provided to enhance the vehicle's operation and stability during operation over uneven terrain and in standing crops.

It is yet another object of the present invention to provide a trailer that features a pivotal tandem axle beam arrangement on each side, which has a simple construction and which allows the trailer to "step" or "walk over" humps and the like types of surface undulations during spraying or other types of agricultural treatment, the trailer being suitable for towing over relatively soft levied fields, such as those used for the growing of rice, without rutting either the levee banks or the soft soil of the field.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention, in order to achieve the objects set forth above, a first aspect of the present invention comprises an agricultural vehicle adapted to traverse uneven terrain. The vehicle comprises a chassis, and first and second wheel assemblies, each wheel assembly comprising a forward wheel and a rear wheel, and a support structure on which the forward wheel and the rear wheel are rotatably mounted, the support structure being pivotally supported on the chassis about a pivot axis located between the forward and rear wheels. The support structure of each wheel assembly according to the invention is constructed and arranged such that the forward wheel of each wheel assembly supports less weight of the vehicle than the rear wheel of the respective wheel assembly when the vehicle is traversing level terrain, and vertical movement of one of the forward wheel and the rear wheel induces synchronous movement in the other of the forward wheel and the rear wheel.

The agricultural vehicle according to the present invention preferably comprises a limit means for limiting the pivotal movement of the support structures of each wheel assembly about the pivot axis. The limit means preferably comprises means for limiting the pivotal movement of the support structures to a predetermined range of pivotal movement in a direction in which the rear wheels move upwardly and the forward wheels move downwardly. The limit means may also comprise means for limiting the pivotal movement of the support structures to a predetermined range of pivotal movement in a direction in which the rear wheels move downwardly and the forward wheels move upwardly.

The limit means is preferably adjustable for changing a range of free pivotal movement of the respective support structure. The limit means can take various forms in accordance with the present invention. For example, the limit means may comprise a fixed abutment for engaging the support structure at a location spaced from the pivot axis. Alternatively, the limit means may comprise a first stop member having a first end connected to the chassis and a second end positioned adjacent to the support structure at a selected first location spaced from the pivot axis, and a first actuator connected to the first stop member for adjusting the selected first location of the first stop member, whereby the first stop member engages the support structure and limits pivotal movement of the support structure in a first direction. A second stop member and second actuator may also be provided for limiting pivotal movement of the support structure in a second direction opposite to the first direction.

Alternatively, the limit means may comprise a flexible member having one end secured to the chassis and another end secured to the support structure at a location spaced from the pivot axis. Alternatively, the limit means may comprise a telescopic arrangement that limits the pivotal movement of the support structure about the pivot axis to within a predetermined range. The limit means may also take a variety of other forms, as shown in the drawings and described below.

The forward and rear wheels of each wheel assembly are preferably equipped with low pressure all terrain tires or an endless track extending around the forward and rear wheels. The forward and rear wheels of each wheel assembly are preferably the same diameter, and a distance between the forward wheel of each wheel assembly and the pivot axis of the respective support structure is preferably greater than a distance between the rear wheel of the wheel assembly and the pivot axis.

The agricultural vehicle according to the present invention may be in the form of a towed trailer having a tow bar connected to the chassis for connection to a prime mover. Alternatively, the vehicle may be a self-propelled vehicle equipped with individual drive units for each of the wheel assemblies. The wheel assemblies may also include a means for adjusting a distance between the pivot axis of the support structure and at least one of the forward and rear wheels to thereby change the weight distribution among the forward and rear wheels of each wheel assembly. The means for adjustment can be in the form of telescoping front and rear arms of the support structure, or an adjustable location of the pivot axis along the length of the support structure.

In accordance with another aspect of the present invention, the objects and advantages set forth above are achieved with a self-propelled agricultural vehicle adapted to traverse uneven terrain. The vehicle comprises a chassis, and first, second, third, and fourth wheel assemblies for supporting the chassis, each wheel assembly comprising a forward wheel and a rear wheel, and a support structure on which the forward wheel and the rear wheel are rotatably mounted. The support structure is pivotally supported on the chassis about a pivot axis located between the forward and rear wheels. The support structure of each wheel assembly according to the invention is constructed and arranged such that the forward wheel of each wheel assembly supports less weight of the vehicle than the rear wheel of the respective wheel assembly when the vehicle is traversing level terrain, and vertical movement of one of the forward wheel and the rear wheel induces synchronous movement in the other of the forward wheel and the rear wheel.

In this arrangement of the invention, the limit means preferably comprises means for limiting the pivotal movement of the support structures to a predetermined amount of pivotal movement about the pivot axis. The vehicle further comprises an endless track associated with each of the wheel assemblies, each of the endless tracks extending about the forward and rear wheels of a respective wheel assembly and being rotatably driven by rotation of at least one of the wheels and preferably both of the wheels.

In the preferred embodiment of this self-propelled vehicle, the chassis comprises a forward portion having the first and second wheel assemblies mounted thereon and a rear portion having the third and fourth wheel assemblies mounted thereon, the forward portion being pivotally connected to the rear portion to permit articulated movement between the forward portion and the rear portion about a vertical axis.

In accordance with another aspect of the present invention, the objects and advantages set forth above are achieved with a self-propelled agricultural vehicle adapted to traverse uneven terrain. The vehicle comprises a chassis and first, second, third, and fourth wheel assemblies for supporting the chassis, each wheel assembly comprising a forward wheel and a rear wheel, and a support structure on which the forward wheel and the rear wheel are rotatably mounted. The support structure is pivotally supported on the chassis about a pivot axis located between the forward and rear wheels. The support structure of each wheel assembly is constructed and arranged such that vertical movement of one of the forward wheel and the rear wheel induces synchronous movement in the other of the forward wheel and the rear wheel. According to this aspect of the invention, the support structure for each wheel assembly is unbiased so as to permit free pivotal movement of each wheel assembly, and each wheel assembly further comprises a limit means for limiting the free pivotal movement of the respective support structure to within a predetermined range.

In this arrangement of the invention, the limit means preferably comprises a first stop member having a first end connected to the chassis and a second end positioned adjacent the support structure at a selected first location spaced from the pivot axis, and a first actuator connected to the first stop member for adjusting the selected first location of the first stop member, whereby the first stop member engages the support structure and limits pivotal movement of the support structure in a first direction. A second stop member and a second actuator may also be provided for limiting pivotal movement of the support structure in a second direction opposite to the first direction. A control means is preferably provided for simultaneously actuating the first actuators of the limit means to set pivotal limits for the first, second, third, and fourth wheel assemblies in the first direction and for simultaneously actuating the second actuators of the limit means to set pivotal limits for the first, second, third, and fourth wheel assemblies in the second direction.

In a towed vehicle embodiment of the present invention, the above objects and advantages are achieved by an arrangement wherein the wheels of the towed vehicles are supported on a pair of longitudinally extending, inverted V-shaped support beams. Each of the wheel support beams is pivotally supported on a side of the towed vehicle and asymmetrically arranged such that the front wheels are supported, for example, approximately twice as far ahead of the pivot axis as the rear wheels are supported behind the axis. With this arrangement, the front wheels may readily ascend a slope while "cranking" the rear wheels downwardly using the mechanical advantage provided by the longer forward support portions of the wheel support members. Since the axes about which beams are pivoted are located toward the rear of the trailer chassis, the cranking tends to lift the aft end of the chassis and, therefore, helps to maintain the trailer relatively level. The arches of the asymmetric inverted V-shaped wheel support members also provide sufficient ground clearance such that the tops of the soft walled levees or the like type of surface undulations over which the towed vehicle is towed are not contacted or damaged to any extent. When descending slopes, the front wheels can descend faster than the rear wheels rise, thereby helping to maintain the trailer in an essentially level or horizontal state.

Adjustably positioned stoppers or limits are provided on each side of the trailer and can be set to damp and/or limit the amount of rotation of the wheel support arms about their respective axes and slow and/or limit the descent of the front wheels after the wheel support arms have undergone a predetermined amount of rotation and have reached given angular positions with respect to the trailer chassis. This provides a much smoother ride, prevents equipment damage, and reduces a draft force required due to the front wheels not having to force their own way out of the furrow. All of this results in a significant reduction in the amount of shock and impact transmitted back to the sprayer or the like type of apparatus carried on the trailer.

The towed vehicle embodiment of the invention is preferably provided with large surface area, low pressure flotation tires to avoid the application of large force per unit area to crops and soil over which the trailer is drawn. For the same reason, the prime mover used to tow the vehicle is also preferably provided with the same type of flotation tires. On the other hand, the self-propelled vehicle embodiment of the present invention may be provided with endless tracks that extend around each of the wheel assemblies to enhance traction of the vehicle and further reduce compaction of the field during operation.

BRIEF DESCRIPTION OF THE DRAWINGS

The various features and advantages of the present invention will become more clearly appreciated as a description is made with reference to the appended drawings. In the drawings:

FIG. 12A is a schematic elevational view of a walking tandem axle arrangement according to the present invention equipped with an adjustable shock absorber arrangement for limiting a range of pivotal movement of the walking beam;

DESCRIPTION OF THE PREFERRED EMBODIMENTS

Figure 1:
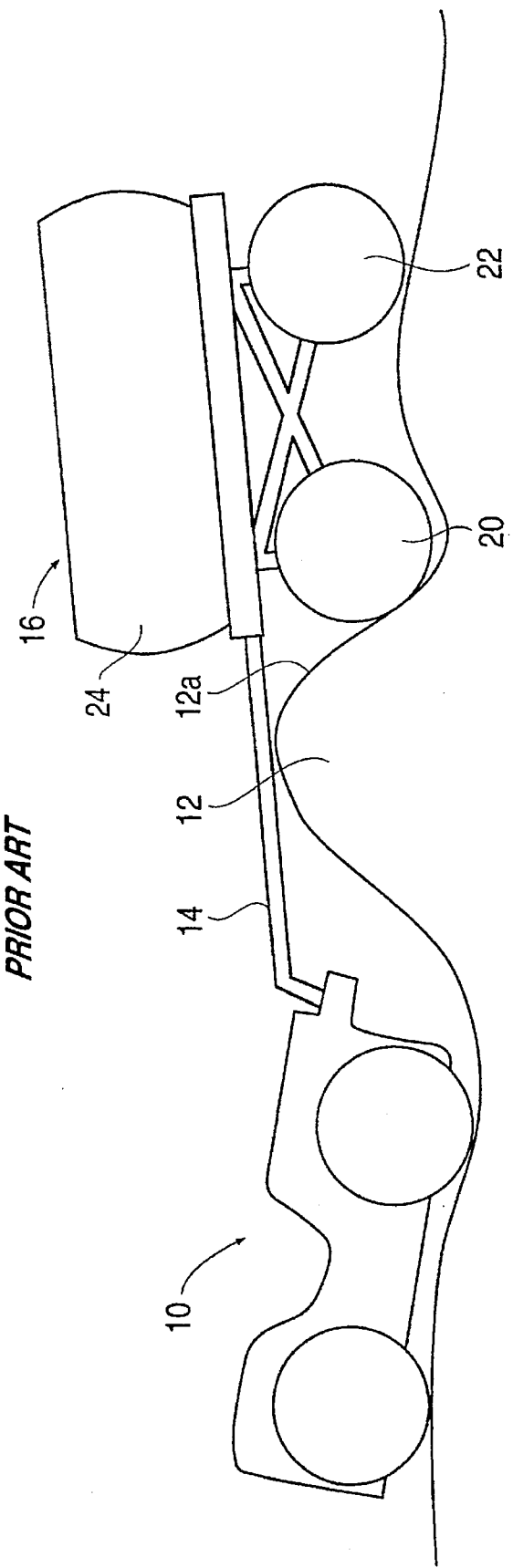
FIG. 1 is a schematic elevational view highlighting the problems that tend to be encountered with conventional type trailer arrangements and the manner in which soft-walled levee banks, for example, tend to become rutted.
Figure 2:
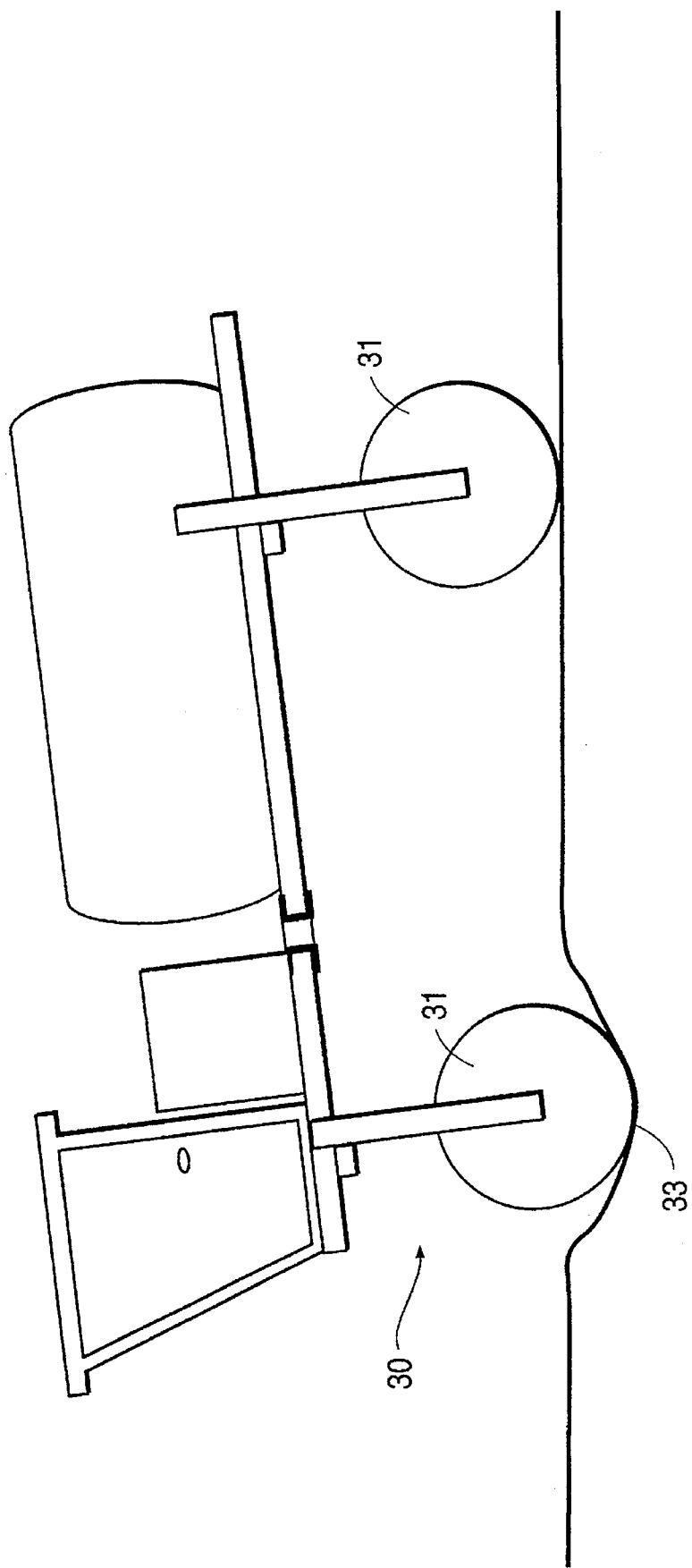
FIG. 2 is an elevational view highlighting the problems that tend to be encountered with a conventional self-propelled spray vehicle supported by single wheels at each of the four corners of the vehicle.
Figure 3:
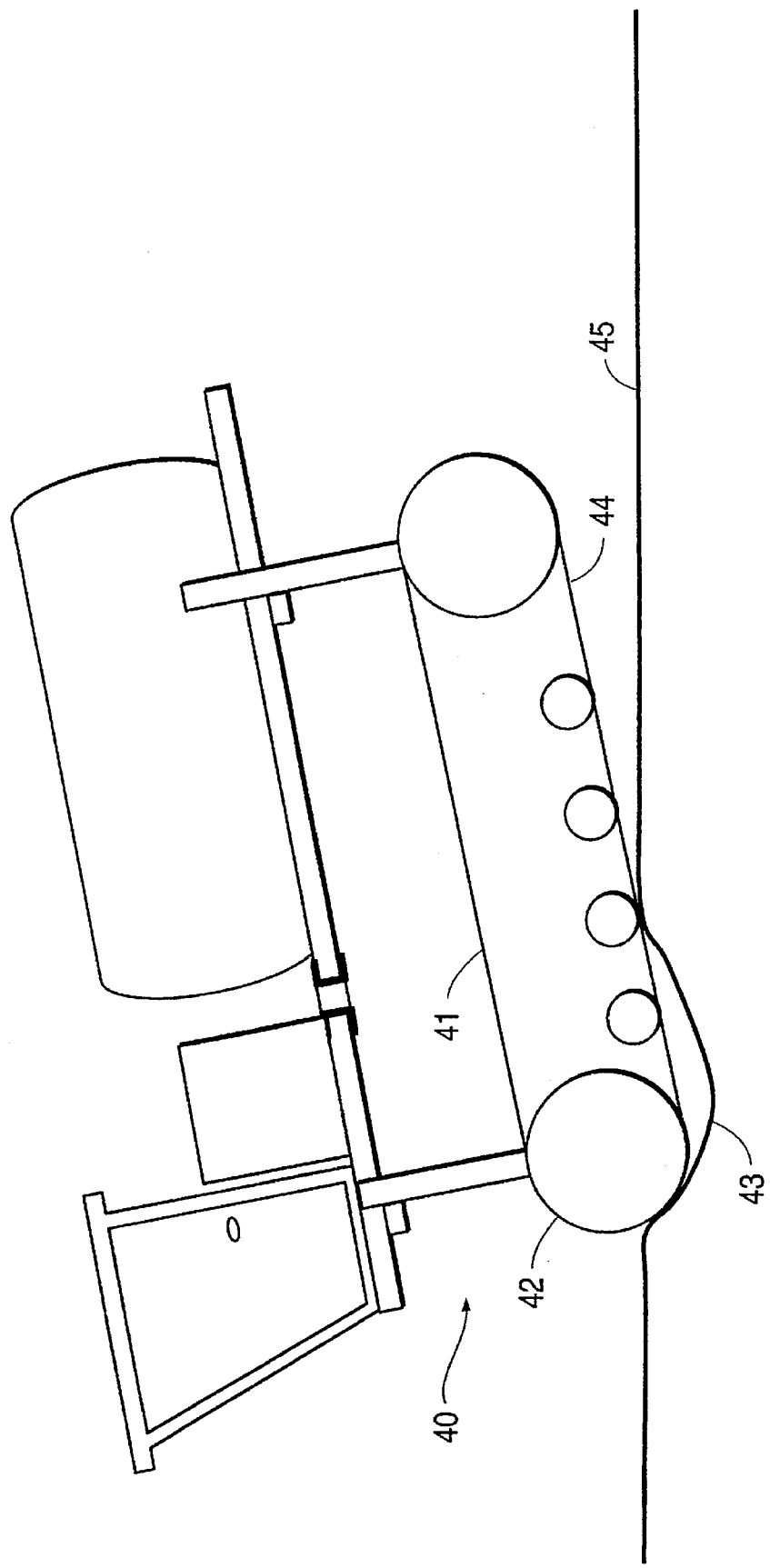
FIG. 3 is an elevational view highlighting the problems that tend to be encountered with a conventional self-propelled spray vehicle supported by two conventional track assembles.
Figure 4:
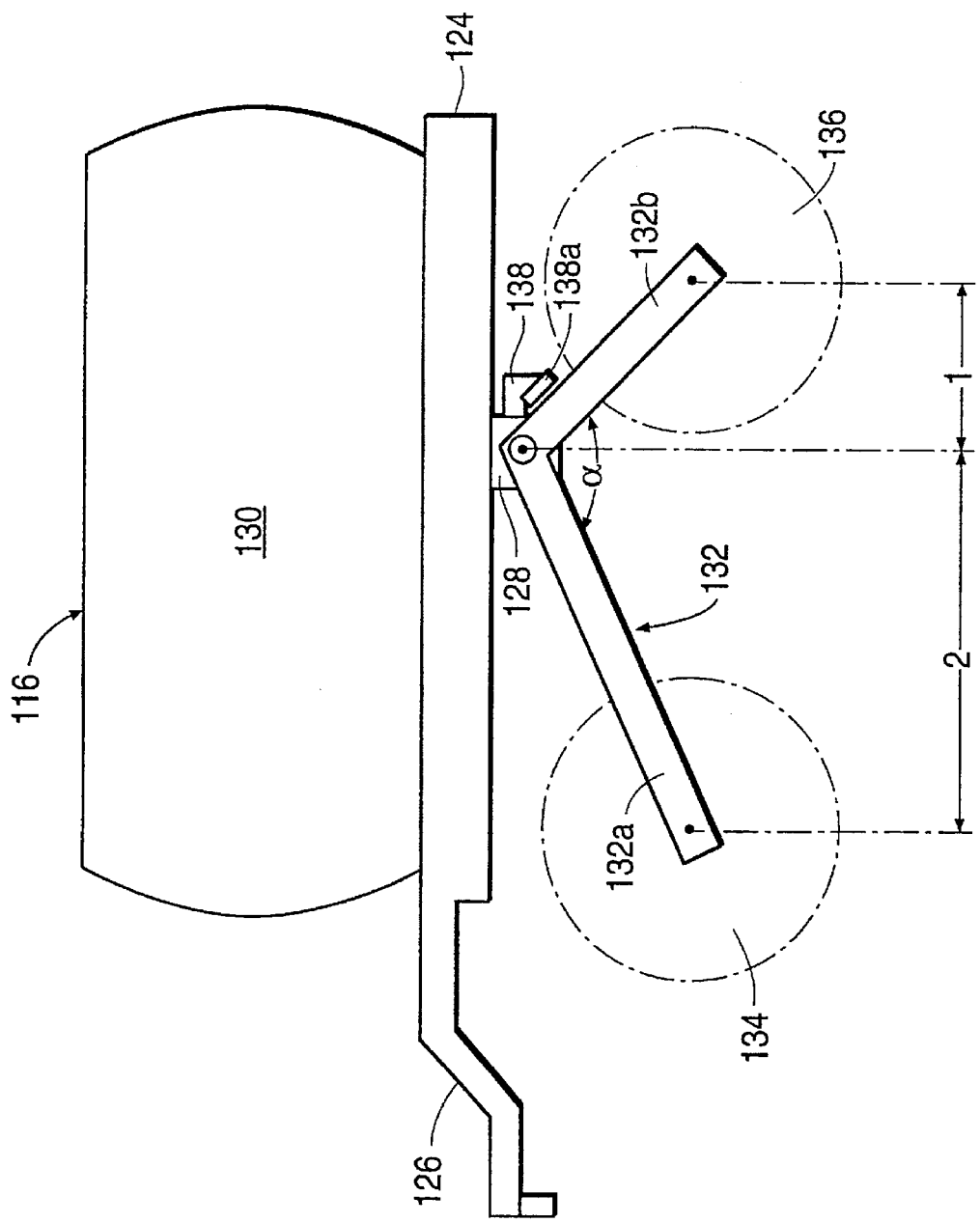
FIG. 4 is a schematic elevational view showing a first embodiment of a trailer equipped with an oscillating or pivoting type walking tandem axle arrangement according to the present invention.

FIG. 4 shows a towed agricultural vehicle according to a first embodiment of the present invention. In this embodiment, an ATV sprayer 116 includes a rectangular chassis 124 and a rigid tow bar 126 adapted for connection to an ATV in the manner generally illustrated in FIG. 1. A cross beam 128 having sufficient rigidity to support the weight of the chassis 124 and any apparatus 130 carried thereon, is attached to the underside of the chassis 124. Asymmetrical inverted V-shaped beam structures 132, which form an essential part of the pivotal walking-type tandem axle arrangement, are pivotally supported on each end of the cross beam 128. Each of these structures includes a forward extending leg portion 132a and a shorter rearwardly extending leg portion 132b. The lengths of the leg portions 132a, 132b and the angle α defined therebetween are selected so that the front wheels 134 are located by a distance ahead of the axis of rotation about which each arm is pivotal, which is approximately twice that by which the rear wheels 136 are located rearward of the axis.

In this embodiment, each of the front and rear wheels are provided with wide profile soft low pressure all-terrain type balloon tires. To allow for the asymmetric nature of the beam structures 132, the cross beam 128 is secured at a location aft of the geometric center of the chassis. Variable stoppers 138 are rigidly connected to the crossbeam 128 in a manner to be engageable with the upper side of the rearwardly extending leg portions 132b. The stoppers include elastomeric blocks adapted to resiliently engage the leg portions 132b after a predetermined amount of upward rotation. The stoppers, therefore, prevent the front wheels 134 from undergoing excessive downward movement and allow the connection provided between the chassis 124 and the prime mover (not shown) by the tow bar 126 to lift the front wheels off the ground or facilitate the upward ascent of the same along an upwardly extending inclined surface.

In the illustrated embodiment, the apparatus carried on the trailer is a spraying apparatus including a tank for carrying liquid to be dispersed over the field. It will of course be appreciated that the present invention is not necessarily limited to spraying or even agricultural use, even though this arrangement clearly finds great utility in the present invention.

Figure 5:
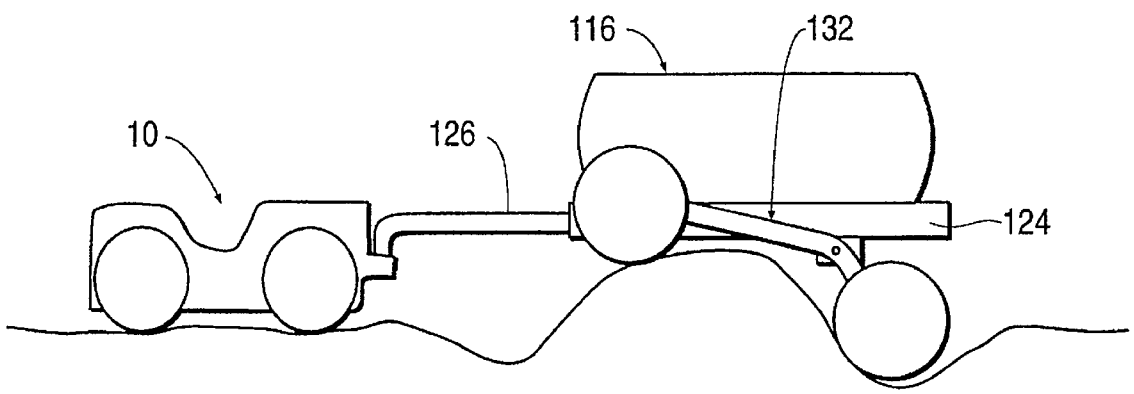
FIGS. 5 and 6 schematically depict a trailer equipped with a pivoting type walking suspension according to the present invention, ascending and descending a surface undulation, respectively.
Figure 6:
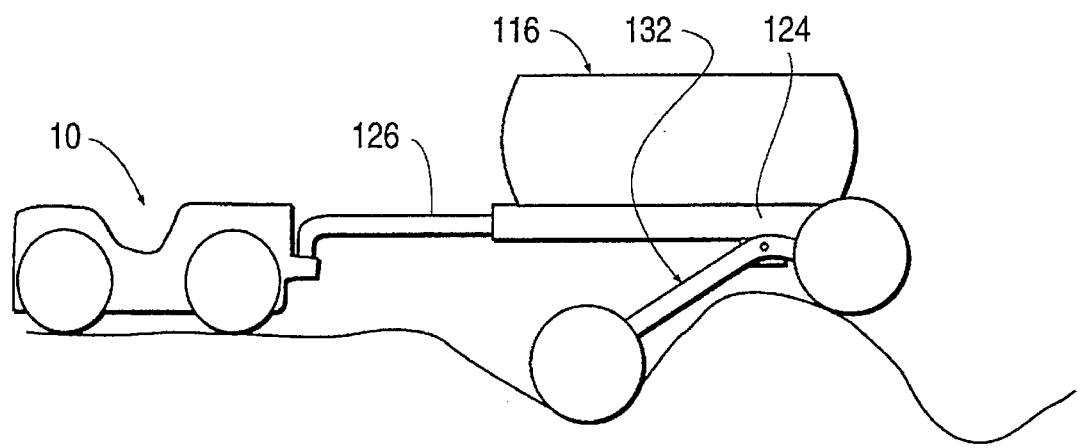

FIGS. 5 and 6 show the ATV sprayer according to the first embodiment of the present invention being towed over a levee by an ATV prime mover and depict the manner in which the pivotal walking-type tandem axle beams allow the arrangement to "step up and over" the undulation or levee relatively smoothly.

Figure 7:
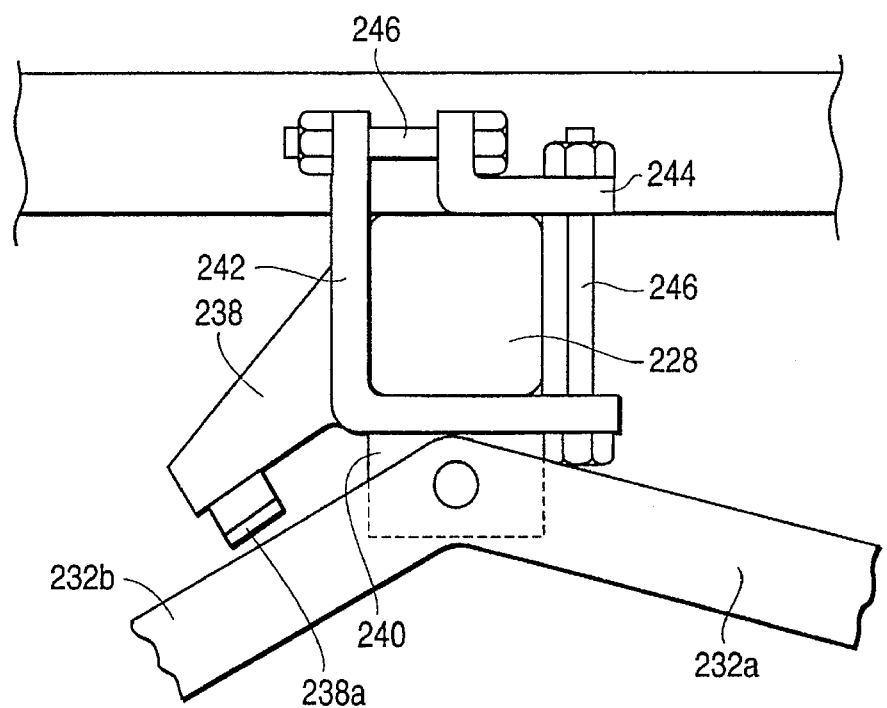
FIG. 7 is a side elevation showing a structure by which a pivoting type walking tandem axle according to the present invention can be adjustably connected to a transverse beam that forms a part of a vehicle chassis.

FIG. 7 shows a structure 240 by which the beams 232 are pivotally connected to the ends of a single crossbeam 228 positioned at a mid portion of the chassis. As shown, the structure 240 is clamped to the cross-beam 228 by a cooperating pair of L-plates 242, 244 and bolts 246. This arrangement allows the width of the beams to be adjusted inwardly or outwardly as desired.

Figure 7A:
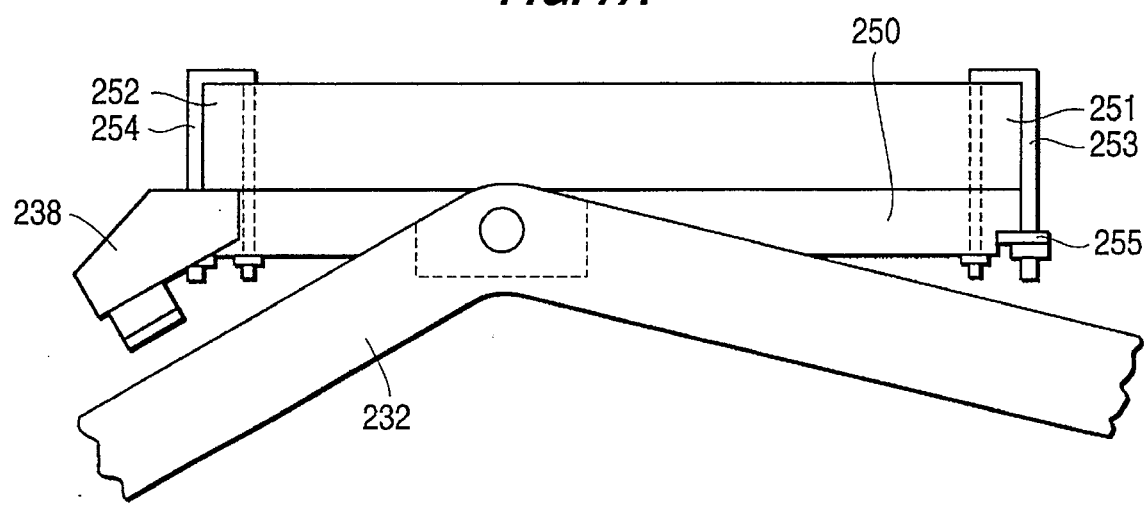
FIG. 7A is a side elevation showing an alternative structure by which a pivoting type walking tandem axle according to the present invention can be adjustably connected to a vehicle chassis.

FIG. 7A shows an alternative structure by which a pivoting type walking tandem axle according to the present invention can be adjustably connected to a vehicle chassis. The structure 250 shown in FIG. 7A is particularly suitable for attaching the walking tandem axle assembly to laterally extending frame members 251, 252 positioned at front and rear portions of the chassis, respectively. As shown, the structure 250 is clamped to the front and rear frame members 251, 252 by U-bolts 253, 254 and clamping plates 255.

Figure 8:
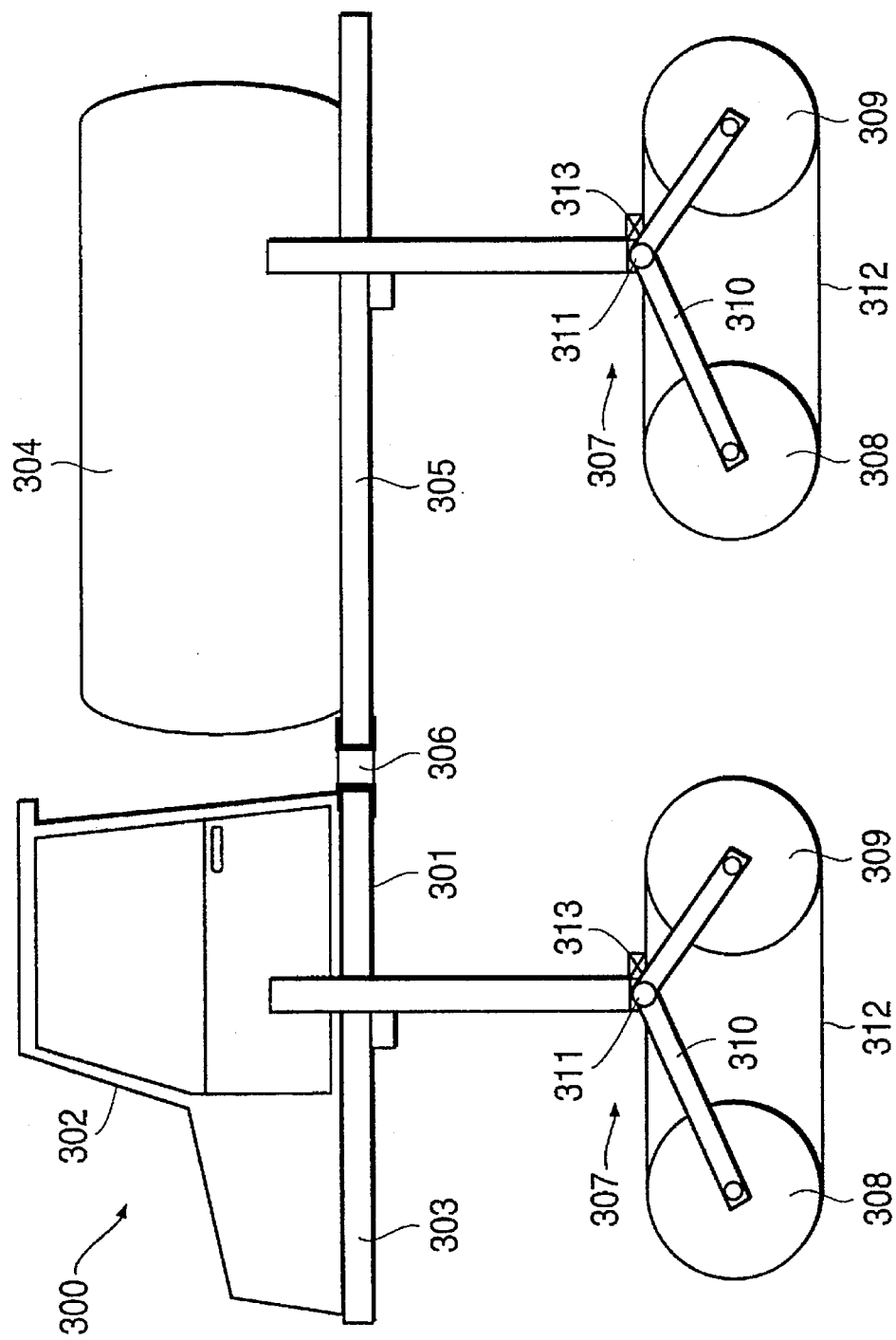
FIG. 8 is a schematic elevational view showing a self-propelled agricultural vehicle equipped with a walking tandem axle arrangement according to the present invention.

FIGS. 8 to 11 illustrate a self-propelled agricultural vehicle 300 equipped with a pivoting type walking tandem axle arrangement according to a second embodiment of the present invention. As shown in FIG. 8, the self-propelled vehicle 300 according to the present invention preferably includes an articulated chassis 301. An operator's cab 302 is provided on a front portion 303 of the vehicle 300 and a tank 304 and spray equipment or the like is supported on a rear portion 305 of the vehicle 300. The front and rear portions 303, 305 of the vehicle 300 are connected to each other by a central vertical pivot point 306 to permit articulation of the vehicle 300 for steering. In a less preferred embodiment, the vehicle 300 can be equipped with automotive-type steering wherein at least the front wheel assemblies can be turned relative to the vehicle chassis for steering.

A wheel assembly 307 is provided at each corner of the vehicle 300 for supporting the vehicle. Each wheel assembly 307 includes a forward wheel 308 and a rear wheel 309, and a walking beam 310 or similar support structure on which the forward wheel 308 and the rear wheel 309 are rotatably mounted. The support structure 310 of each wheel assembly 307 is pivotally supported on the chassis 301 of the vehicle 300 about a pivot axis 311 located between the forward and rear wheels 308, 309.

In a preferred embodiment, an endless track 312 is associated with each of the wheel assemblies 307. The endless tracks 312 extend about the forward and rear wheels 308, 309 of a respective wheel assembly 307 and are rotatably driven by rotation of at least one, and preferably both, of the wheels 308, 309 of the wheel assembly 307. To facilitate proper operation of the endless tracks 312, the wheels 308, 309 of the wheel assemblies 307 are preferably equipped with hard flat tires to engage and frictionally drive the inner surface of the tracks 312. Alternatively, a positive drive arrangement can be used wherein the endless tracks are rotatably driven by a cogged wheel or the like.

Alternatively, the wheel assemblies can be equipped with soft, low pressure, flotation tires instead of endless tracks. In either case, the walking tandem wheel assemblies 307 according to the present invention, in conjunction with endless tracks or flotation tires, provide substantial improvements over the prior art, as described below.

The support structure 310 of each wheel assembly 307 is constructed and arranged so that the forward wheel 308 of each wheel assembly 307 supports less weight of the vehicle 300 than the rear wheel 309 of the wheel assembly 307 when the vehicle 300 is traversing level terrain. Vertical movement of one of the forward wheel 308 and the rear wheel 309 induces synchronous movement in the other of the forward wheel 308 and the rear wheel 309, thereby causing the wheel assembly 307 to "step" or "walk over" undulations in uneven terrain. The support structures 310 of each of the wheel assemblies 307 are unbiased so as to permit free pivotal movement of each wheel assembly 307 as the vehicle 300 traverses uneven terrain.

The arrangement of the present invention wherein the forward wheel 308 of each wheel assembly 307 supports less weight than the rear wheel 309 of the wheel assembly 307 is a significant feature of the present invention that provides advantages over the prior art. Specifically, it has been discovered that when moving a sprayer through narrow-rowed or solid-seeded crops, such as drilled small grains, rice or soybeans, damage to the crop can be minimized using the tandem wheel assemblies 307 of the present invention. Crop damage is reduced by the tandem wheel assemblies 307 of the present invention because less pressure is applied on the leading wheel 308 and more on the trailing wheel 309. With less pressure on the leading wheels 308, less plant damage results because the cell walls of the plants tend to stretch more readily as they are laid over by the front wheel 308 or front portion of the track assembly. The trailing wheels 309 or rear portion of the track assembly can then pass over the laid-over plants without crushing the plant cells. This allows the plants to stand erect after being passed over by the wheel assemblies 307 and to thereby continue growing with very little damage.

An adjustable stopper arrangement 313 is provided for limiting the free pivotal movement of the support structures 310 of each wheel assembly 307 about the pivot axis 311 to within a predetermined range. The stopper arrangement 313 can be provided in various forms, as described below with reference to FIGS. 12 to 18. It will be appreciated that the stopper arrangements 313 shown in FIGS. 12 to 18 are usable with either the self-propelled vehicle or the towed vehicle embodiments of the present invention.

Figure 9:
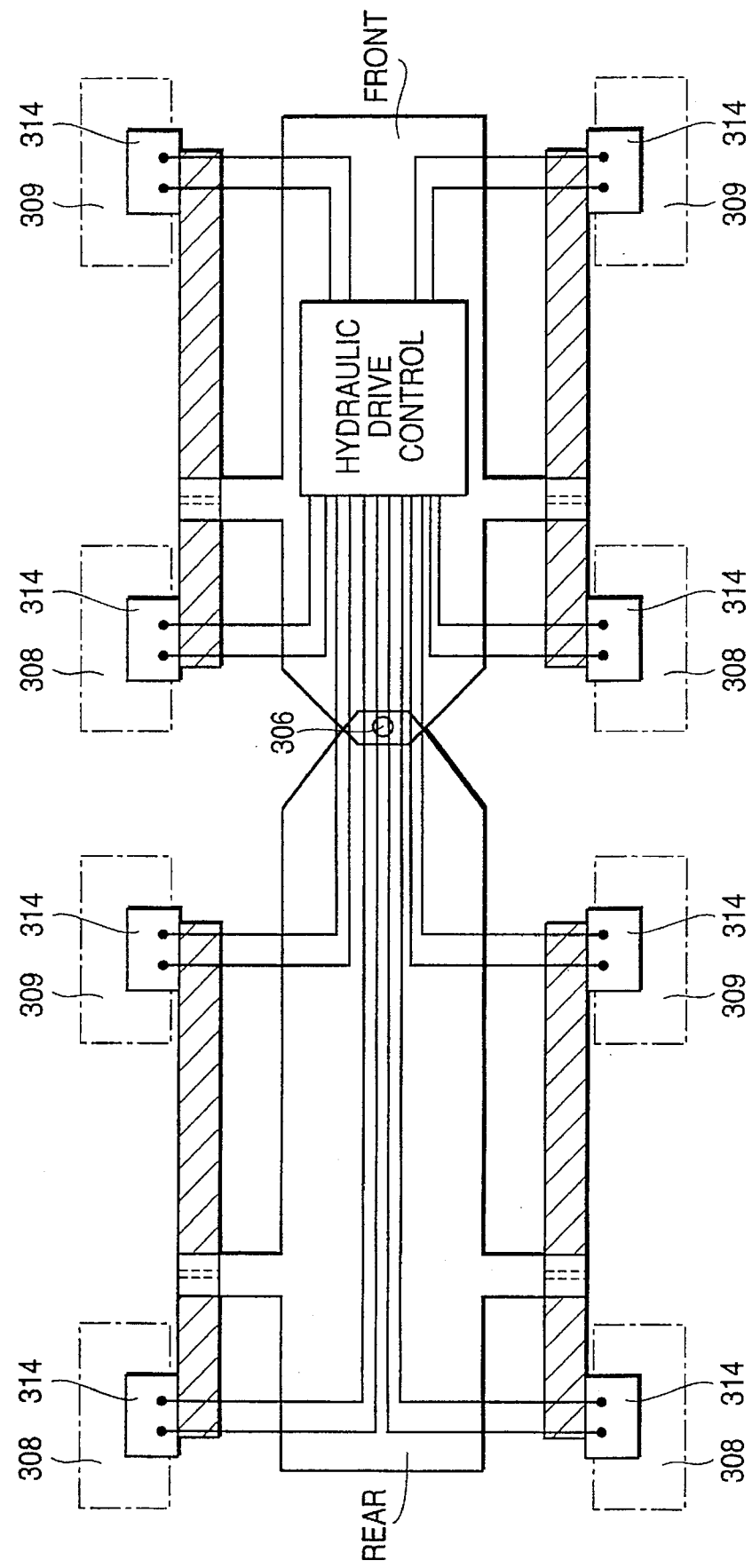
FIG. 9 is a schematic diagram showing a hydraulic drive circuit for driving the individual wheels of the self-propelled vehicle shown in FIG. 8.

A hydraulic drive circuit for driving the individual wheels 308, 309 of the self-propelled vehicle 300 according to the present invention is shown in FIG. 9. The hydraulic drive circuit includes a drive motor 314 provided for each of the eight wheels 308, 309 of the vehicle 300. The drive motors 314 are connected to a common hydraulic drive control 315, which includes a hydrostatic transmission or the like. A less preferred embodiment of the invention can be made using only one drive wheel for each wheel assembly 307. However, it is preferred that all of the wheels 308, 309 of the vehicle 300 be driven to maximize traction (e.g., when flotation tires are used) or to improve the operation of the endless track assemblies 312.

Figure 10:
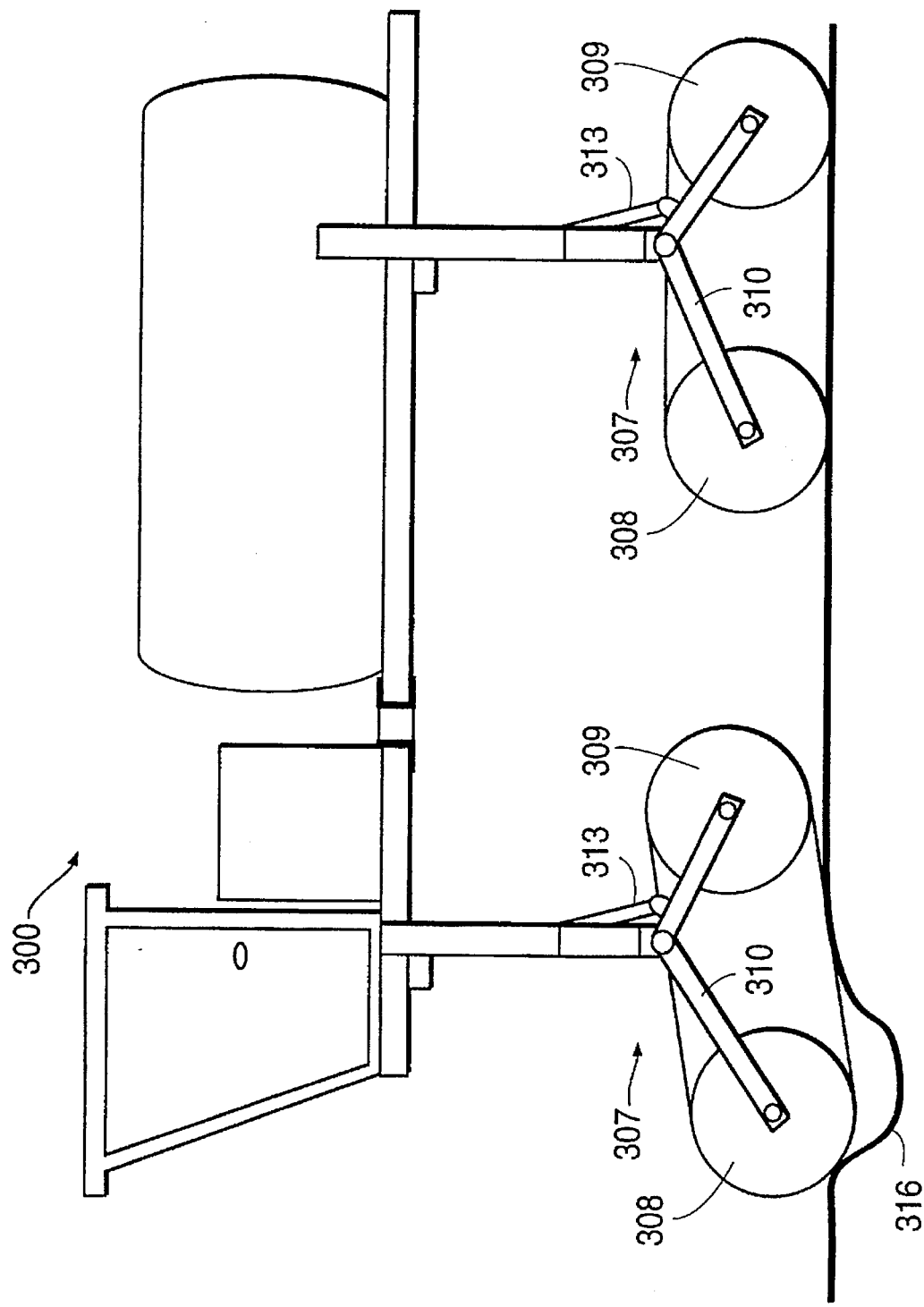
FIG. 10 is an elevational view showing the operation of the self-propelled vehicle according to the present invention equipped with a stopper arrangement to limit downward travel of the front wheel of the walking tandem axle arrangement.

The operation of the self-propelled vehicle 300 equipped with a stopper arrangement to limit downward travel of the front wheel 308 of the walking tandem axle arrangement is shown in FIG. 10. As the vehicle 300 traverses a wash-out or ditch 316, the front wheel 308 of the wheel assembly 307 tends to drop into the wash-out or ditch 316. The stopper arrangement 313 of the present invention prevents the front wheel 308 from dropping past a predetermined point, thereby allowing the wheel assembly 307 to "bridge" over the wash-out, ditch, or other surface irregularity 316. In this manner, the wheel assembly 307 significantly reduces major impacts and stress to the vehicle suspension, increases the stability of the vehicle, minimizes disruptions to the spraying or other material application equipment that might cause chemical spills or uneven application, and improves the operator's comfort.

Figure 11:
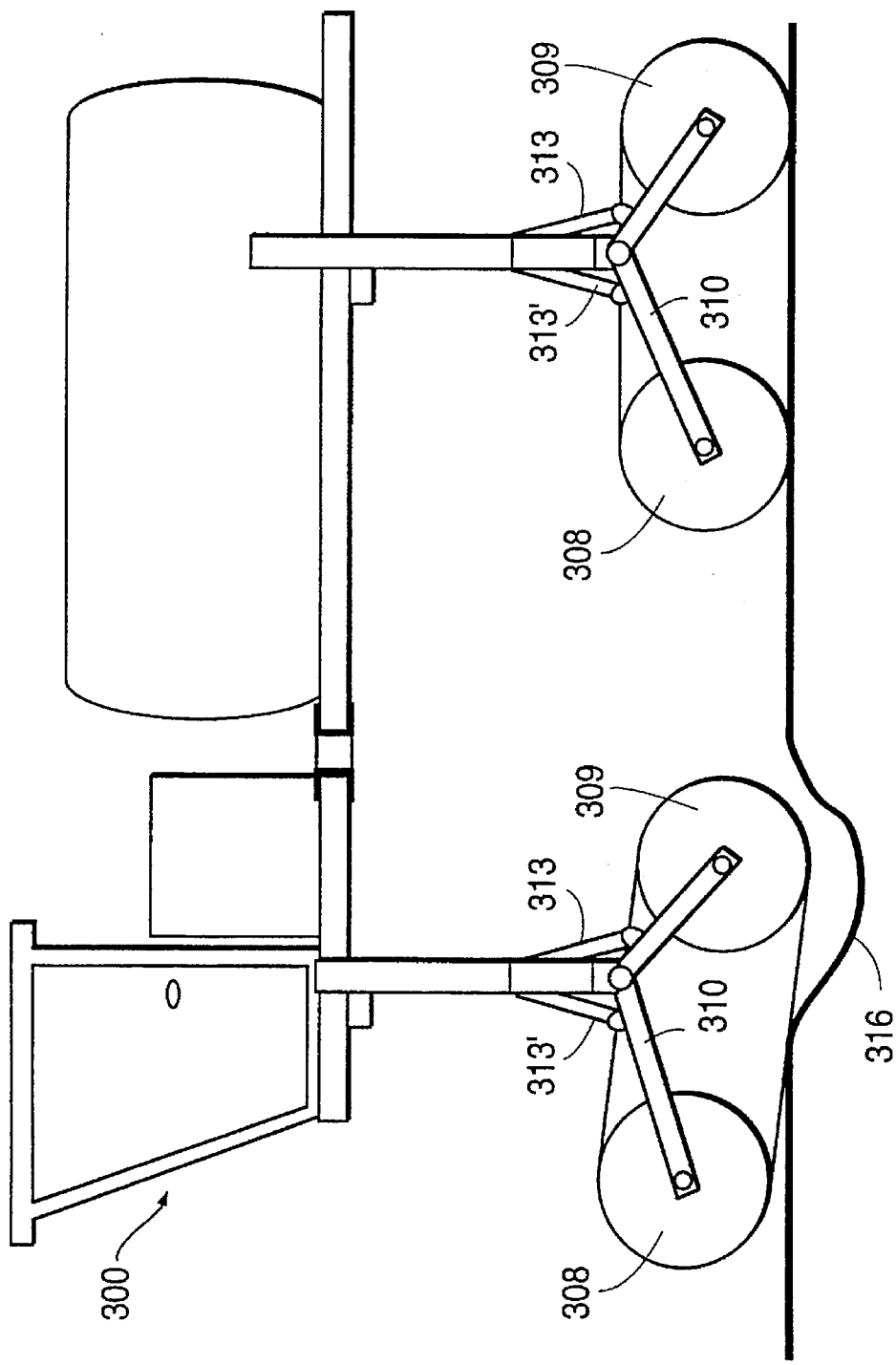
FIG. 11 is an elevational view showing the operation of the self-propelled vehicle according to the present invention equipped with a stopper arrangement to limit downward travel of the rear wheel of the walking tandem axle arrangement.

FIG. 11 shows the operation of the self-propelled vehicle 300 equipped with a stopper arrangement 313 to limit downward travel of the rear wheel 309 of the walking tandem axle arrangement. As seen in FIG. 11, the stopper arrangement 313' for limiting downward travel of the rear wheel 309 can further enhance the vehicle performance by preventing the rear wheel 309 from falling into a deep wash-out or ditch 316 after the front wheel 308 traverses the wash-out or ditch 316. It will be appreciated that the stopper arrangements 313, 313' for limiting the downward travel of either of the front or rear wheels 308, 309 can be adjusted to provide a range of movement suitable for a particular field. For example, a large range of pivoting movement is preferred when the vehicle 300 is traversing rice levees or the like, while a small range of pivoting movement is preferred when the vehicle 300 is traversing a relatively level field that might contain deep wash-outs or the like hidden under a standing crop.

Figure 12:
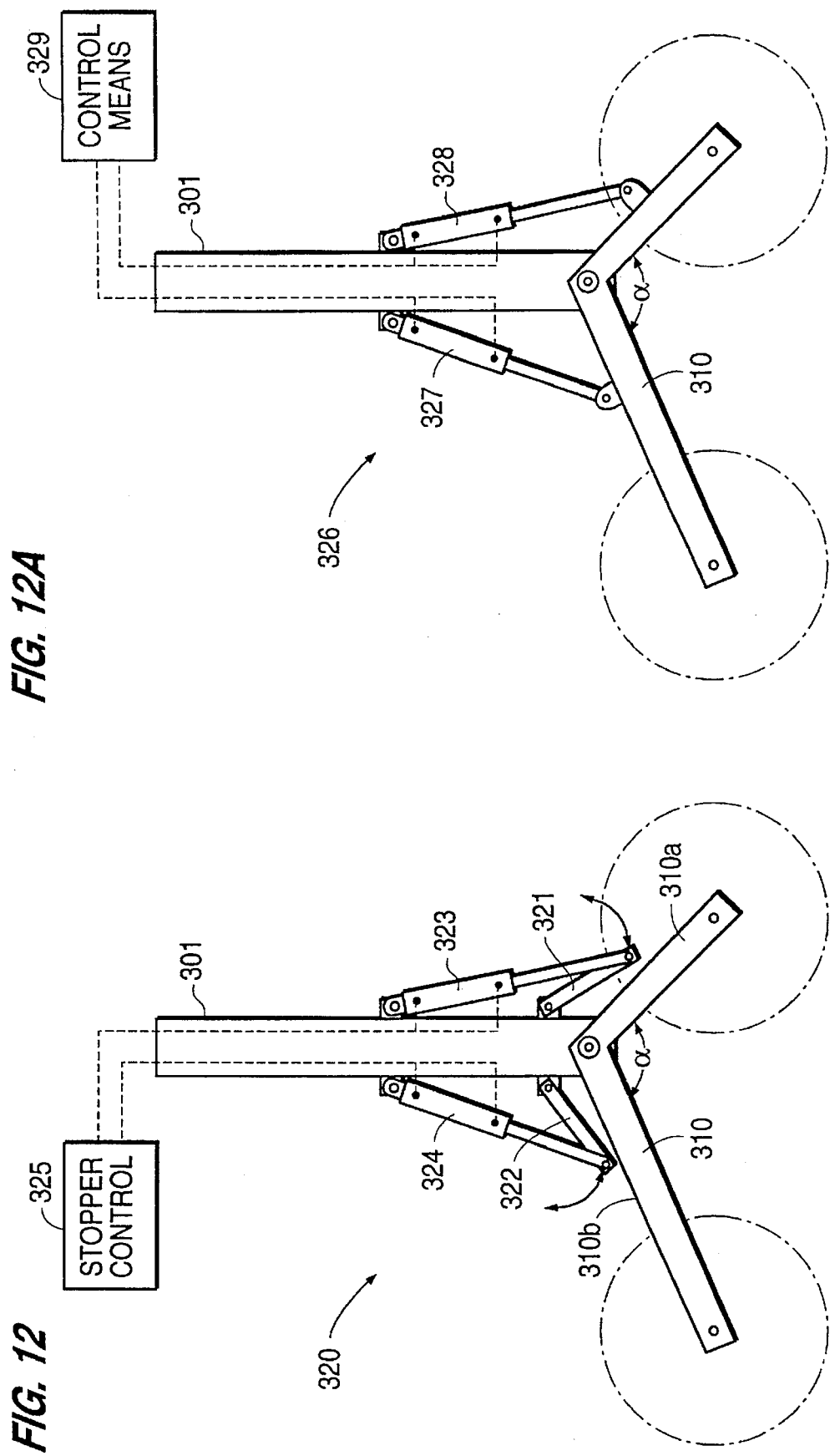
FIG. 12 is a schematic elevational view of a walking tandem axle arrangement according to the present invention equipped with a hydraulically adjustable stopper arrangement for limiting a range of pivotal movement of the walking beam.

A hydraulically adjustable stopper arrangement 320 for limiting up and down travel of the walking beam 310 according to a preferred embodiment is shown in FIG. 12. The stopper arrangement 320 includes a first stopper arm 321 pivotally mounted to the vehicle chassis 301 for engaging a rear arm 310a of the walking beam 310, and a second stopper arm 322 pivotally mounted to the vehicle chassis 301 for engaging a front arm 310b of the walking beam 310. First and second hydraulic cylinders 323, 324 are provided to adjust the position of the stopper arms 321, 322. The hydraulic cylinders 323, 324 are preferably controlled by a hydraulic control 325 or the like provided in a location convenient for the operator to adjust while operating the vehicle.

In a preferred embodiment, all of the rear cylinders 323 of the stopper arrangements 320 are tied together so that a single adjustment can be made by the operator to set the rear stopper position for all of the wheel assemblies. Similarly, all of the front cylinders 324 of the stopper arrangements 320 are tied together so that a single adjustment can be made to set the front stopper position. Thus, when an operator of the vehicle 300 arrives at a field to be treated, an easy and convenient adjustment of the stopper positions can be made to prepare the vehicle for optimum performance in that particular field.

FIG. 12A shows an alternative arrangement 326 for limiting pivotal movement of the walking beam assembly. The arrangement shown in FIG. 12A includes first and second adjustable shock absorbers 327, 328 pivotally connected between the chassis 301 and the front and rear arms, respectively, of the walking beam 310. The shock absorbers 327, 328 in this embodiment are preferably adjustable pneumatically or hydraulically by a control means 329 operable by the operator to provide on-the-go adjustment.

The shock absorbers 327, 328 can be provided with a means for applying pressure to the front and/or rear arms of the walking beam 310 to selectively adjust the weight distribution among the front and rear wheels of each wheel assembly. Alternatively, the shock absorbers 327, 328 can be designed to permit relatively unbiased movement of the walking beam 310 about the pivot axis within a predetermined range, and to limit movement outside of the predetermined range by creating a high flow restriction within the shock absorbers 327, 328 outside of the predetermined range. As in the FIG. 12 embodiment, the front and rear shock absorbers 327, 328 of all of the wheel assemblies can be tied together so that a single adjustment can be made by the operator to set the adjustment of the front shock absorbers 327 and the rear shock absorbers 328, respectively.

Figure 13:
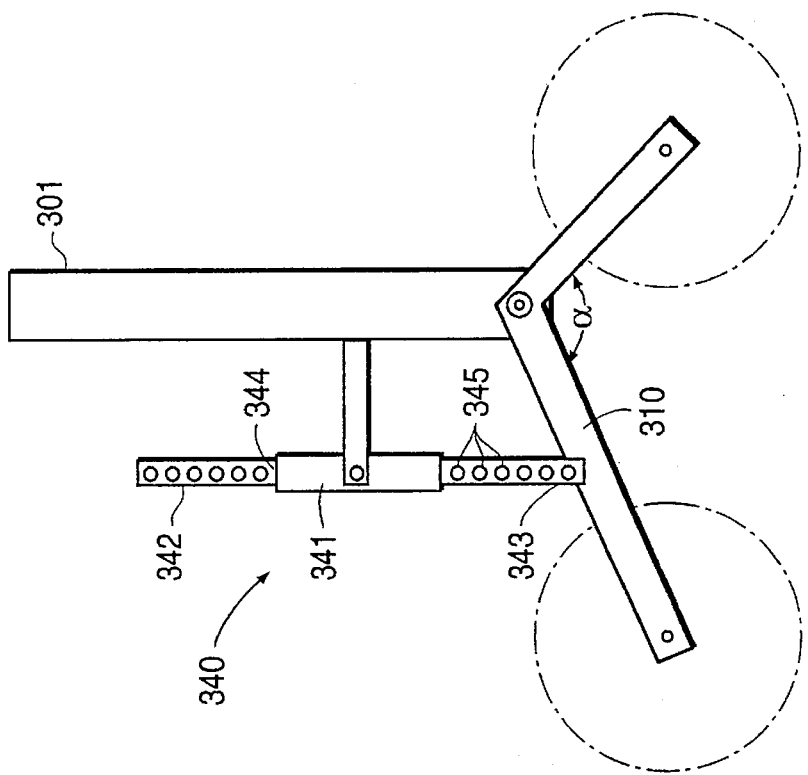
FIG. 13 is a schematic elevational view of a walking tandem axle arrangement according to the present invention equipped with an adjustable chain arrangement for limiting pivotal movement of the walking beam.

Another adjustable stopper arrangement 330 according to the present invention is shown in FIG. 13. In this embodiment, a flexible member 331, such as a chain, cable, or the like, is provided for limiting travel of the walking beam. The flexible member 331 is connected at one end 332 to the chassis 301, and at another end 333 to the walking beam 310. In the arrangement shown in FIG. 13, the flexible member 331 is connected to the front portion of the walking beam 310 to limit downward movement of the front wheel 308. A second flexible member (not shown) can also be connected to the rear portion of the walking beam 310 to limit downward movement of the rear wheel 309.

Figure 14:
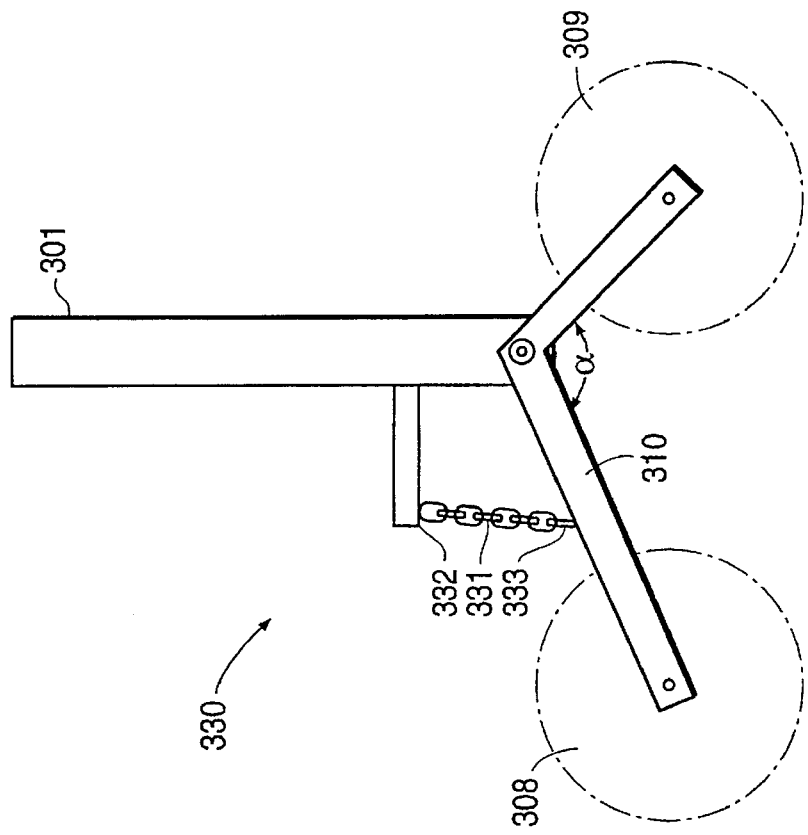
FIG. 14 is a schematic elevational view of a walking tandem axle arrangement according to the present invention equipped with a telescoping tube arrangement for limiting a range of pivotal movement of the walking beam.

Another adjustable stopper arrangement 340 according to the present invention is shown in FIG. 14. In this embodiment, a telescoping tube arrangement is provided for limiting travel of the walking beam 310. The telescoping tube arrangement includes a tube 341 pivotally connected to the chassis 301 of the vehicle, and a rigid member 342, such as a rod, pipe, or the like, having one end 343 connected to the walking beam 310 and a portion 344 extending through the tube 341. The rigid member 342 is provided with a series of adjustment holes 345 or grooves along its length for receiving a pin or clamp or the like at a selected position above and below the tube 341, respectively.

The amount of movement of the walking beam 310 in either direction with the stopper arrangement 340 shown in FIG. 14 is limited by the telescoping movement of the rigid member 342 through the tube 341 until the pin or clamp engages a respective end of the tube 341. In an alternative embodiment (not shown), the telescoping tube arrangement can be positioned on the other side of the pivot axis and extend from a rear portion of the walking beam 310, rather than the front portion. The operation is the same in either embodiment.

Figure 15:
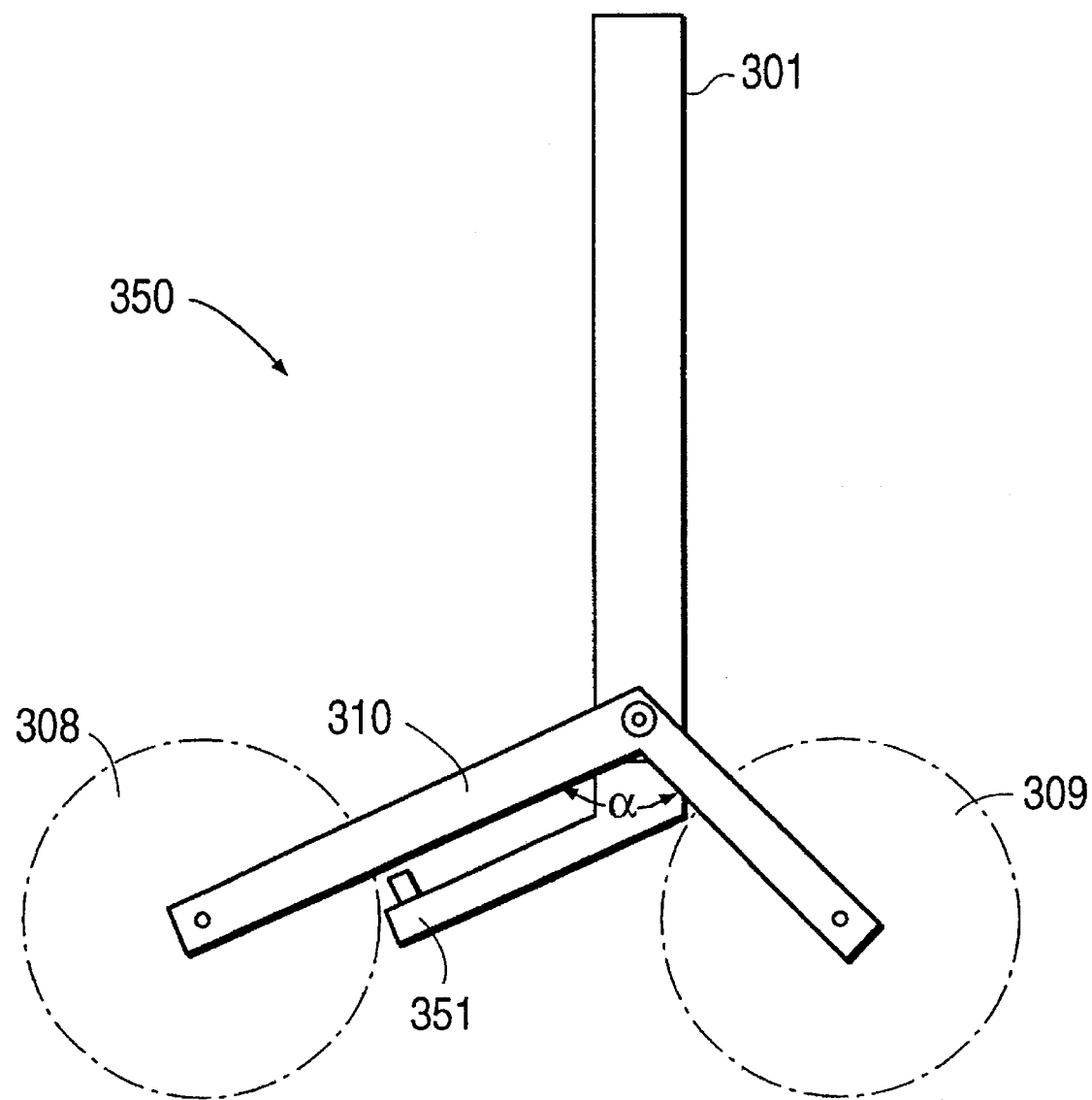
FIG. 15 is a schematic elevational view of a walking tandem axle arrangement according to the present invention equipped with an adjustable stop arrangement on an underside of the beam for limiting pivotal movement of the walking beam.

Another adjustable stopper arrangement 350 according to the present invention is shown in FIG. 15. In this embodiment, an adjustable stop 351 is fixed to the chassis 301 and positioned adjacent an underside of the walking beam 310. As shown in FIG. 15, the adjustable stop 351 positioned adjacent the underside of the front portion of the walking beam limits the downward travel of the front wheel 308 of the wheel assembly. A second adjustable stop (not shown) can be suitably positioned to limit the downward travel of the rear wheel 309 of the wheel assembly. For example, a U-shaped strap can be fixed to the stop 351 and extend over the front arm of the walking beam 310. The U-shaped strap can be adjusted to a suitable position to limit upward movement of the front arm of the walking beam 310, thereby limiting the downward travel of the rear wheel 309.

Figure 16:
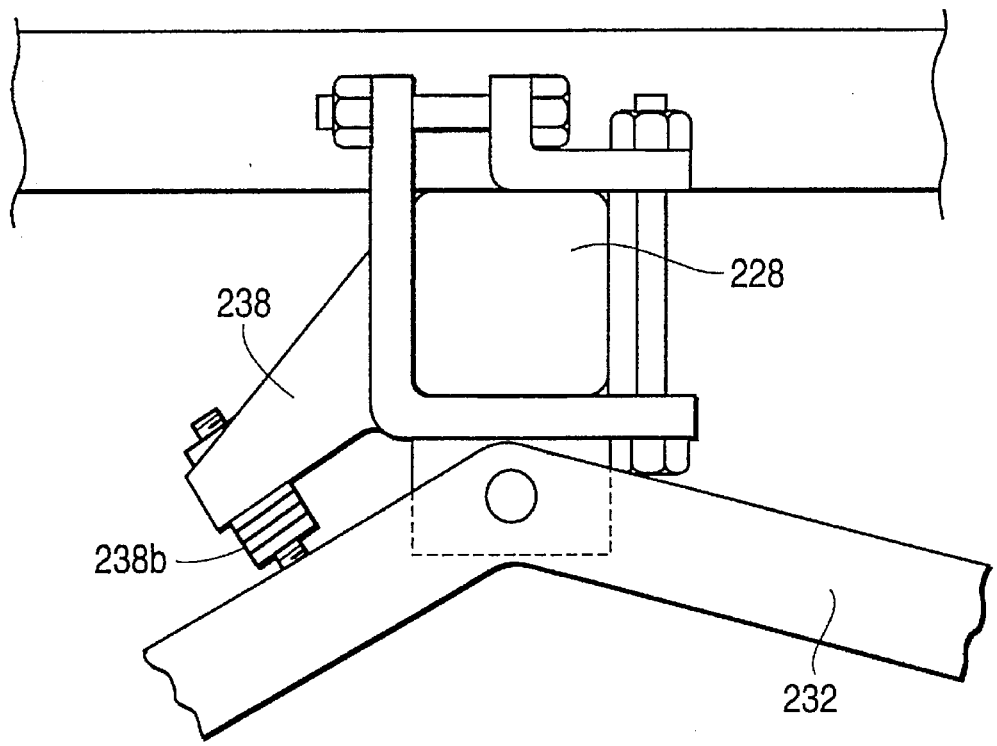
FIG. 16 is a side elevational view of a walking tandem axle arrangement according to the present invention equipped with a stop arrangement using shims for adjusting the range of pivotal movement of the walking beam.
Figure 17:
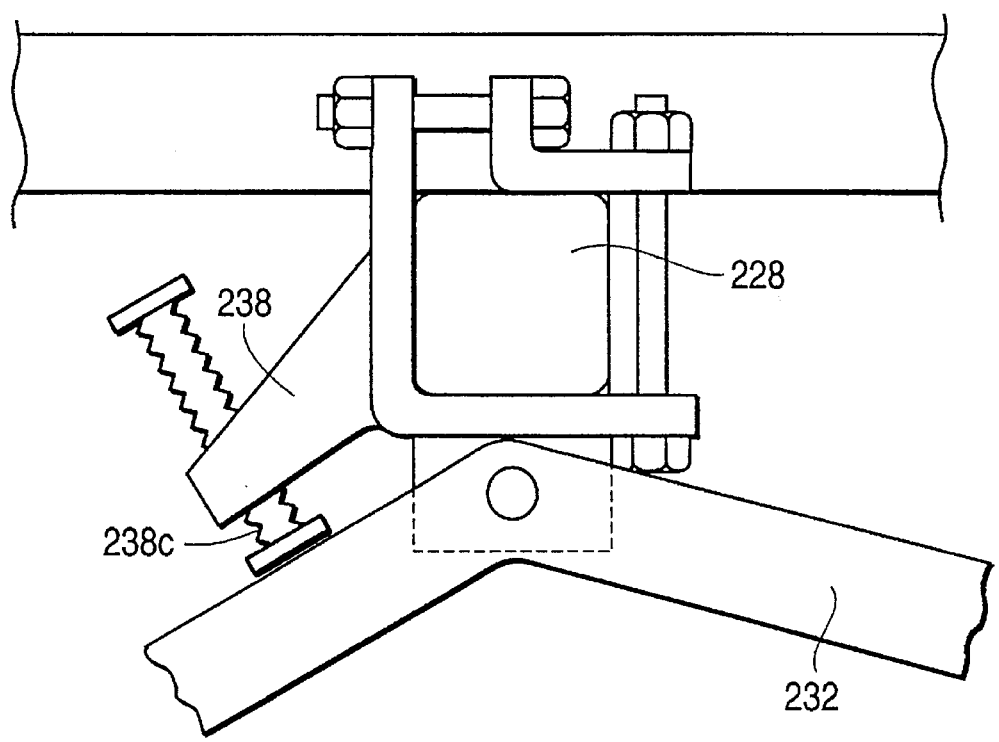
FIG. 17 is a side elevational view of a walking tandem axle arrangement according to the present invention equipped with a threaded stop arrangement for adjusting the range of pivotal movement of the walking beam.
Figure 18:
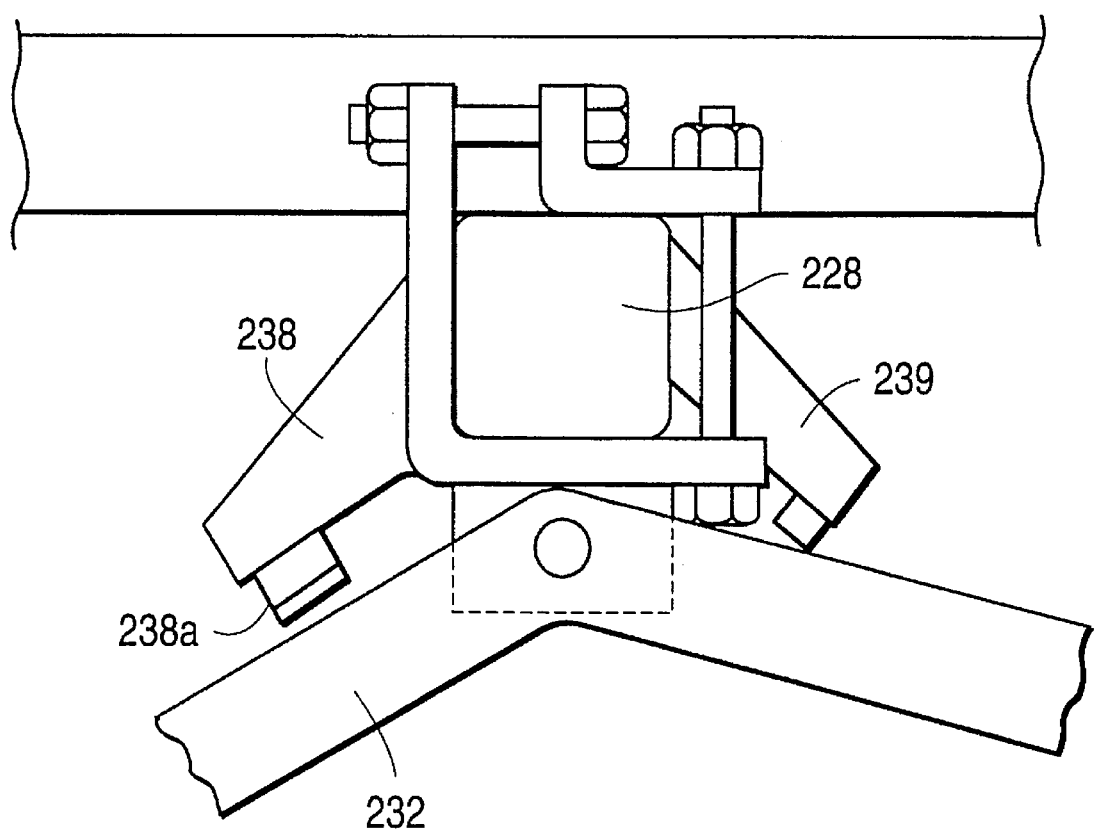
FIG. 18 is a side elevational view of a walking tandem axle arrangement according to the present invention equipped with a stop arrangement on both sides of the pivot point for limiting the range of pivotal movement of the walking beam.

FIGS. 16 to 18 show alternative embodiments of the adjustable stopper arrangement according to the present invention. The adjustable stopper arrangement shown in FIG. 16 uses shims 238b for adjusting the location of the stop for limiting movement of the walking beam 232. The adjustable stopper arrangement shown in FIG. 17 uses a threaded member 238c for adjusting the location of the stop for limiting movement of the walking beam 232. The adjustable stopper arrangement shown in FIG. 18 includes first and second stopper arms 238, 239 positioned adjacent an upper surface of the walking beam 232. The first and second stopper arms 238, 239 function to limit movement of the walking beam 232 to within a predetermined range in either direction.

Figure 19:
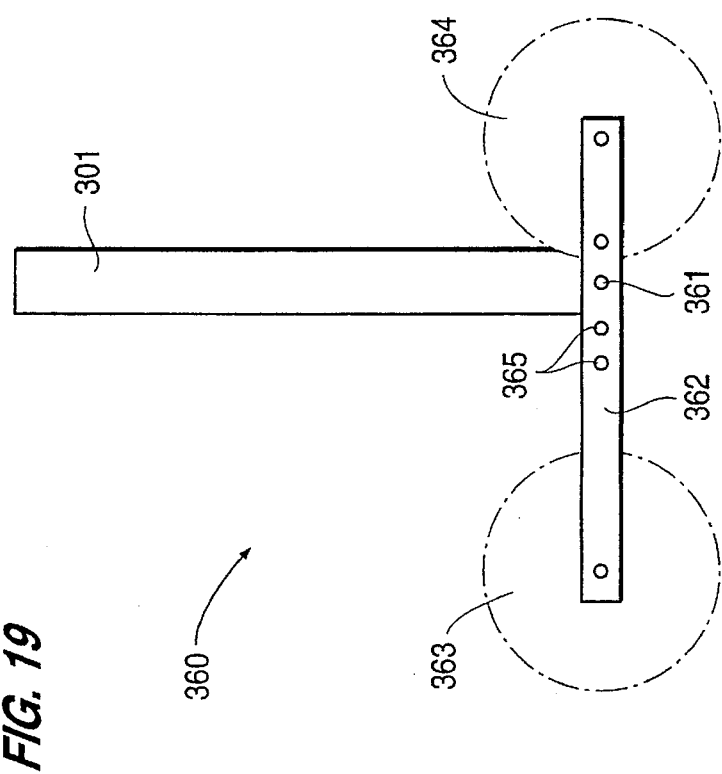
FIG. 19 is a side elevational view of a walking tandem axle arrangement according to the present invention in which the pivot point of the walking beam can be adjusted.

FIG. 19 shows a walking tandem axle arrangement 360 according to the present invention in which the pivot point 361 of the walking beam 362 can be adjusted. For example, to reduce the weight distribution on the front wheel 363 of the tandem wheel assembly, the pivot point 361 can be moved slightly closer to the front wheel 363. This adjustment permits the operator to modify the operational characteristics of the walking beam arrangement 360 to take into account variables such as levee width and height or vehicle load, for example. However, the location of the pivot point 361 preferably remains closer to the rear wheel 364 than the front wheel 363 to provide the benefits of a lower weight distribution on the front wheels 363, as described above. The pivot point 361 can be adjusted using a series of spaced holes 365 located along the walking beam 362 or by using an adjustable clamp (not shown) to secure the walking beam 363 to the chassis 301.

As shown in FIG. 19, the walking beam 362 is a straight beam extending between the front and rear wheels 363, 364. The straight beam may be suitable in the self-propelled version of the present invention, for example, where the endless track assembly eliminates the need for a high clearance between the front and rear wheels 363, 364.

Figure 20:
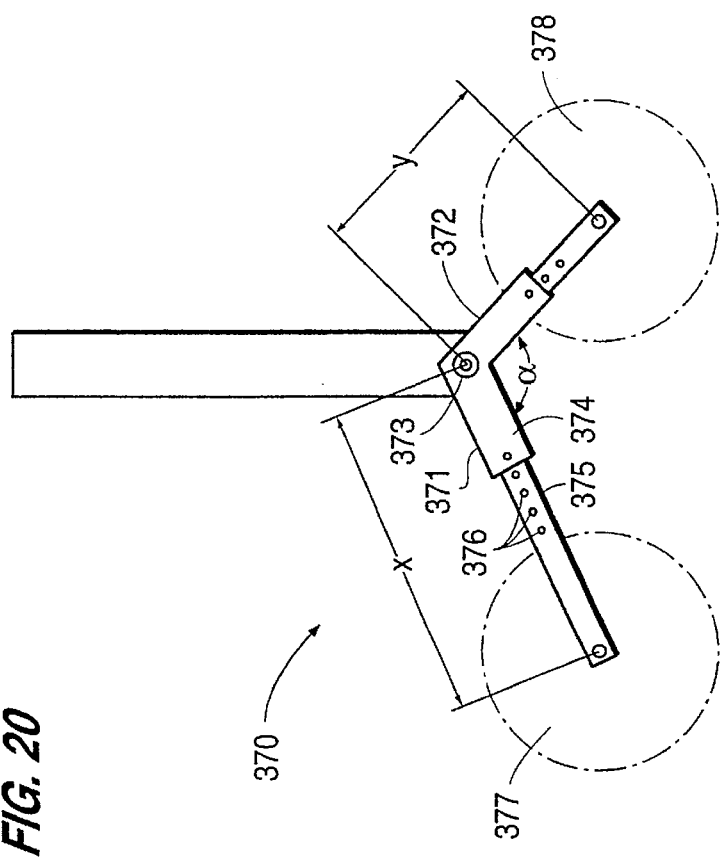
FIG. 20 is a side elevational view of a walking tandem axle arrangement according to the present invention in which the length of the front and rear arms of the walking beam are adjustable relative to the pivot point of the walking beam.

FIG. 20 shows a walking tandem axle arrangement 370 according to the present invention in which the length of the front and rear arms 371, 372 of the walking beam are adjustable relative to the pivot point 373 of the walking beam. As shown in FIG. 20, the front arm 371 of the walking beam comprises a female portion 374 and a male portion 375 received within the female portion 374 to provide telescoping adjustment of the length of the front arm 371. A series of adjustment holes 376 are provided in the male portion 375 (or the female portion 374) so that the length X of the front arm 371 can be fixed at a selected length. The rear arm 372 of the walking beam has substantially the same construction as the front arm 371 so that the length Y of the rear arm 372 can be fixed at a selected length. By adjusting the length of the front and rear arms 371, 372, respectively, the weight distribution on the front and rear wheels 377, 378 can be adjusted as necessary.

Figure 21:
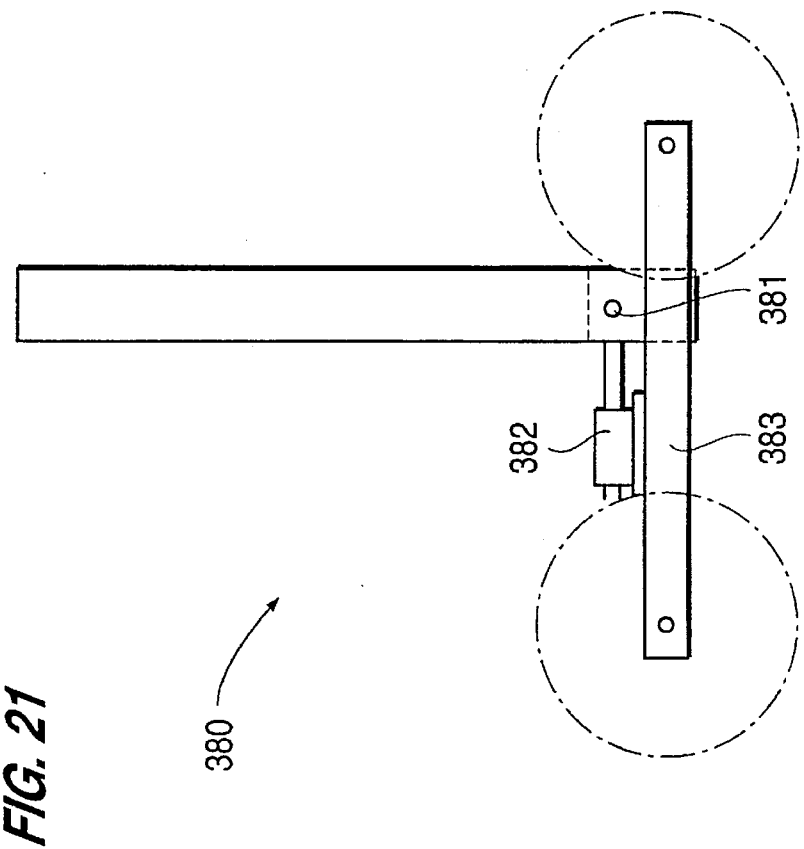
FIG. 21 is a side elevational view of a walking tandem axle arrangement according to the present invention in which the pivot point of the walking beam is adjusted using an actuator.

FIG. 21 shows a walking tandem axle arrangement 380 according to the present invention in which the pivot point 381 of the walking beam is adjusted using an actuator 382. The actuator 382 functions to slide the walking beam 383 relative to the pivot point 381 to change the weight distribution of the vehicle on the front and rear wheels of each wheel assembly. The actuator 382 can be hydraulically, pneumatically, or electrically controlled by the operator from a remote location.

Figure 22:
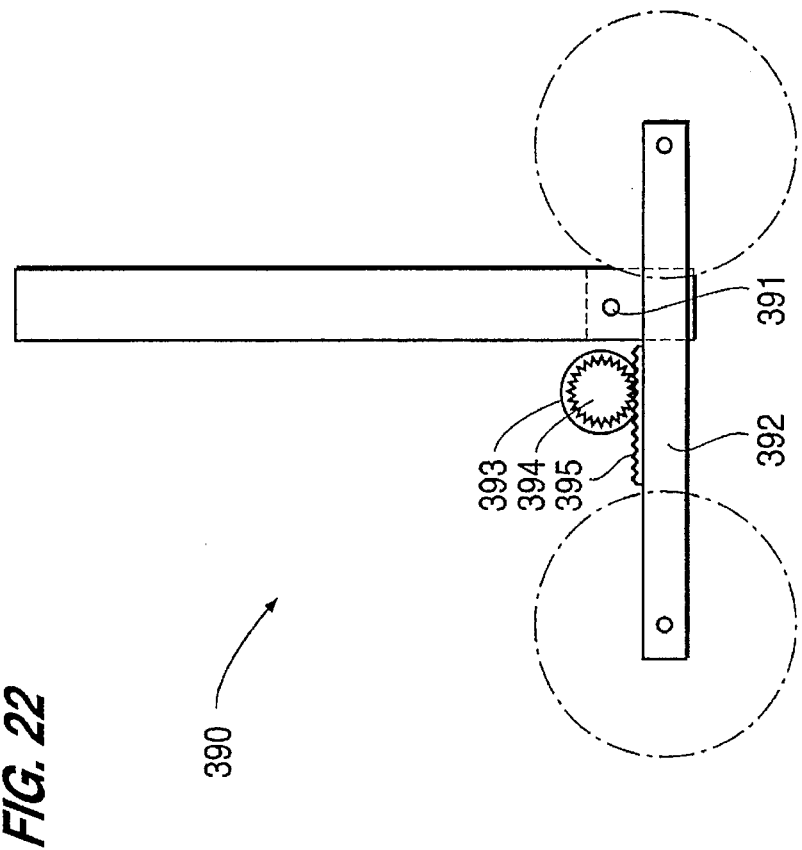
FIG. 22 is a side elevational view of a walking tandem axle arrangement according to the present invention in which the pivot point of the walking beam is adjusted using an orbit motor.

FIG. 22 shows a walking tandem axle arrangement 390 according to the present invention in which the pivot point 391 of the walking beam 392 is adjusted using an orbit motor 393. The orbit motor 393 has a rotatable gear 394 that engages a fixed gear 395 on the walking beam 392 to slide the walking beam 392 relative to the pivot point 391 to change the weight distribution of the vehicle on the front and rear wheels of each wheel assembly. The orbit motor 393 can be hydraulically, pneumatically, or electrically controlled by the operator from a remote location.

Figure 23:
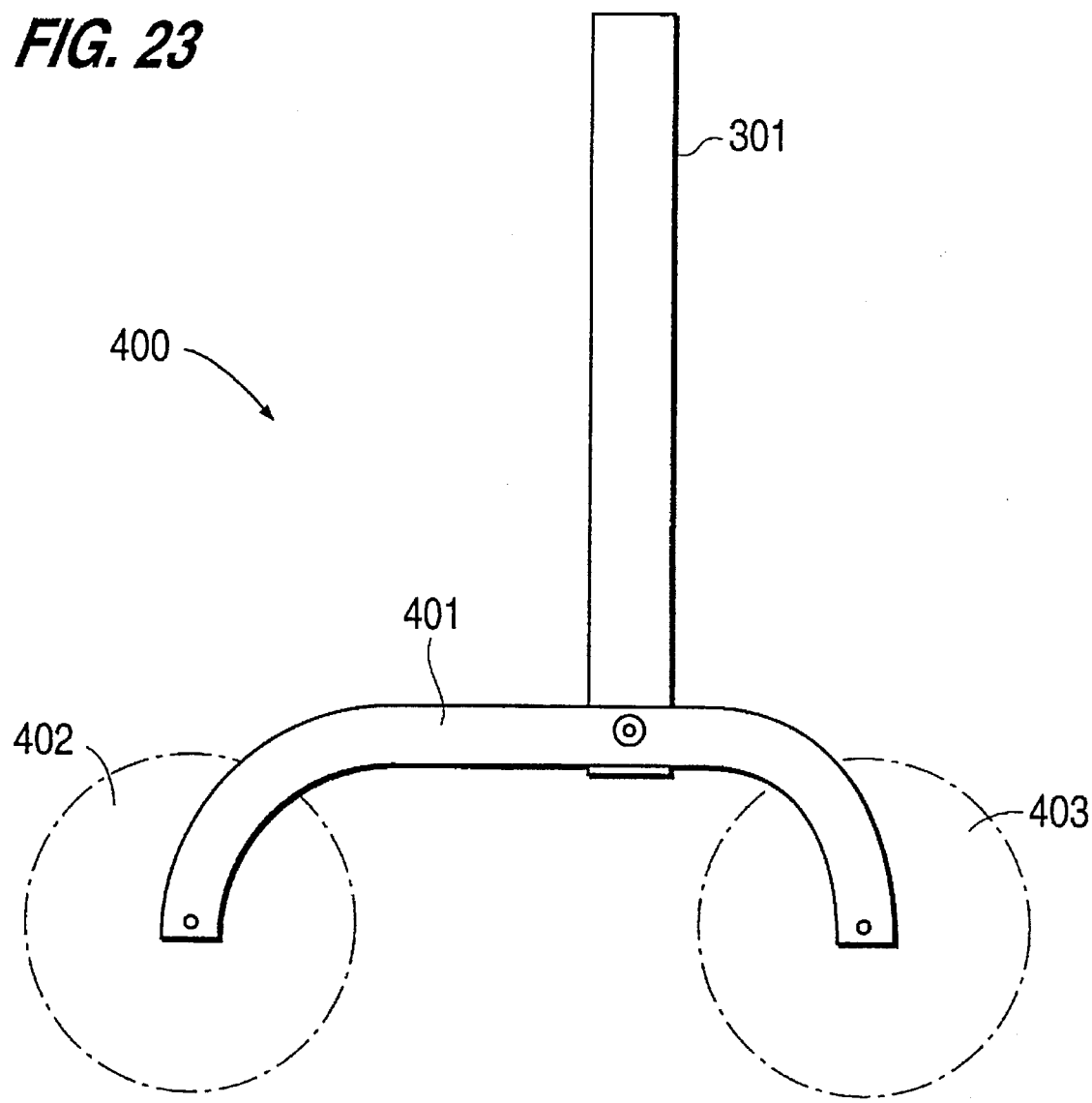
FIG. 23 is a side elevational view of a walking tandem axle arrangement according to the present invention in which the walking beam has a generally inverted U-shape.

FIG. 23 shows an alternative embodiment of a walking tandem axle arrangement 400 according to the present invention in which the walking beam 401 has a generally inverted U-shape. It will be appreciated that other shapes of the tandem axle arrangement can also be used. However, it is preferred that the walking beam be shaped to provide a high clearance between the front and rear wheels 402, 403, especially if an endless track arrangement is not used, to enable the wheel assembly to traverse steep levees and the like without the walking beam damaging the top of the levee.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. A vehicle adapted to traverse uneven terrain, comprising:

a chassis;

first and second wheel assemblies, each wheel assembly comprising a forward wheel and a rear wheel, and a support structure on which said forward wheel and said rear wheel are rotatably mounted, said support structure being pivotally supported on said chassis about a pivot axis located between said forward and rear wheels;

said support structure of each wheel assembly being constructed and arranged such that the forward wheel of each wheel assembly supports less weight of the vehicle than the rear wheel of the respective wheel assembly when the vehicle is traversing level terrain, and vertical movement of one of the forward wheel and the rear wheel induces synchronous movement in the other of the forward wheel and the rear wheel.

2. The vehicle according to claim 1, wherein the support structures of each of the wheel assemblies are unbiased so as to permit free pivotal movement of each wheel assembly, each wheel assembly further comprising a limit means for limiting the free pivotal movement of the respective support structure to within a predetermined range.

3. The vehicle according to claim 2, wherein said limit means comprises means for limiting the pivotal movement of said support structures to a predetermined amount of pivotal movement in a direction in which said rear wheels move upwardly and said forward wheels move downwardly.

4. The vehicle according to claim 3, wherein said limit means further comprises means for limiting the pivotal movement of said support structures to a predetermined amount of pivotal movement in a direction in which said rear wheels move downwardly and said forward wheels move upwardly.

5. The vehicle according to claim 2, wherein each of said limit means is adjustable for changing a range of free pivotal movement of the respective support structure about said pivot axis.

6. The vehicle according to claim 2, wherein said limit means comprises a fixed abutment for engaging said support structure at a location spaced from said pivot axis.

7. The vehicle according to claim 2, wherein said limit means comprises a first stop member positioned adjacent to said support structure and a first actuator for moving said first stop member to a selected first location spaced from said pivot axis, whereby said first stop member engages said support structure and limits pivotal movement of the support structure in a first direction.

8. The vehicle according to claim 7, wherein said limit means further comprises a second stop member positioned adjacent to said support structure and a second actuator for moving said second stop member to a selected first location spaced from said pivot axis, whereby said second stop member engages said support structure and limits pivotal movement of the support structure in a second direction opposite to said first direction.

9. The vehicle according to claim 8, further comprising third and fourth wheel assemblies having generally the same construction as said first and second wheel assemblies, said first, second, third, and fourth wheel assemblies being respectively mounted at four corners of the vehicle, and at least one of the wheels in each wheel assembly being rotatably driven by a driving means for propelling the vehicle, wherein said limit means are provided for each of said first, second, third, and fourth wheel assemblies, and further comprising control means for simultaneously actuating the first actuators of the limit means to set the pivotal limits for at least two of the four wheel assemblies in the first direction and for simultaneously actuating the second actuators of the limit means to set the pivotal limits for at least two of the four wheel assemblies in the second direction.

10. The vehicle according to claim 2, wherein said limit means comprises a flexible member having one end secured to said chassis and another end secured to said support structure at a location spaced from said pivot axis.

11. The vehicle according to claim 2, wherein said limit means comprises a first member pivotally mounted to said chassis and a second member pivotally mounted to said support structure at a location spaced from said pivot axis, said second member being telescopically mounted to said first member, said second member having means for limiting a telescopic movement relative to said first member to within a predetermined range to thereby limit the pivotal movement of said support structure about said pivot axis to within a predetermined range.

12. The vehicle according to claim 1, wherein said forward and rear wheels of each wheel assembly are equipped with low pressure all terrain tires.

13. The vehicle according to claim 1, wherein said forward and rear wheels of each wheel assembly are essentially the same diameter, and wherein a distance between the forward wheel of each wheel assembly and the pivot axis of the respective support structure is greater than a distance between the rear wheel of the wheel assembly and the pivot axis.

14. The vehicle according to claim 1, further comprising a tow bar connected to said chassis for connection to a prime mover.

15. The vehicle according to claim 1, further comprising first and second endless tracks associated with said first and second wheel assemblies, respectively, said endless tracks each extending about the forward and rear wheels of a respective wheel assembly.

16. The vehicle according to claim 1, further comprising third and fourth wheel assemblies having generally the same construction as said first and second wheel assemblies, said first, second, third, and fourth wheel assemblies being respectively mounted at four corners of the vehicle, and at least one of the wheels in each wheel assembly being rotatably driven by a driving means for propelling the vehicle.

17. The vehicle according to claim 16, wherein the support structures of each of the wheel assemblies are unbiased so as to permit free pivotal movement of each wheel assembly, each wheel assembly further comprising a limit means for limiting the free pivotal movement of the respective support structure within a predetermined range.

18. The vehicle according to claim 1, further comprising means for biasing the support structures of each wheel assembly in at least one direction about the pivot axis of the support structure for changing the weight distribution among the forward and rear wheels of each wheel assembly.

19. The vehicle according to claim 1, further comprising means associated with each wheel assembly for adjusting a distance between said pivot axis of the support structure and at least one of the forward and rear wheels to thereby change the weight distribution among the forward and rear wheels of each wheel assembly.

20. A self-propelled vehicle adapted to traverse uneven terrain, comprising:
a chassis;
first, second, third, and fourth wheel assemblies for supporting said chassis, each wheel assembly comprising a forward wheel and a rear wheel, and a support structure on which said forward wheel and said rear wheel are rotatably mounted, said support structure being pivotally supported on said chassis about a pivot axis located between said forward and rear wheels;
said support structure of each wheel assembly being constructed and arranged such that the forward wheel of each wheel assembly supports less weight of the vehicle than the rear wheel of the respective wheel assembly when the vehicle is traversing level terrain, and vertical movement of one of the forward wheel and the rear wheel induces synchronous movement in the other of the forward wheel and the rear wheel.

21. The vehicle according to claim 20, further comprising a limit means associated with each of said wheel assemblies for limiting the pivotal movement of said support structures to a predetermined amount of pivotal movement about said pivot axis in a direction in which said rear wheels move upwardly and said forward wheels move downwardly.

22. The vehicle according to claim 21, wherein said limit means associated with each of said wheel assemblies further comprises means for limiting the pivotal movement of said support structures to a predetermined amount of pivotal movement about said pivot axis in a direction in which said rear wheels move downwardly and said forward wheels move upwardly.

23. The vehicle according to claim 20, further comprising an endless track associated with each of said wheel assemblies, each of said endless tracks extending about the forward and rear wheels of a respective wheel assembly and being rotatably driven by rotation of at least one of said wheels.

24. The vehicle according to claim 20, wherein said chassis comprises a forward portion having said first and second wheel assemblies mounted thereon and a rear portion having said third and fourth wheel assemblies mounted thereon, said forward portion being pivotally connected to said rear portion to permit articulated movement between said forward portion and said rear portion for steering.

25. The vehicle according to claim 20, wherein at least said first and second wheel assemblies are steerable for turning the vehicle.

26. The vehicle according to claim 20, wherein at least one of the forward and rear wheels in each of said wheel assemblies is rotatably driven by a driving means for propelling the vehicle.

27. A self-propelled vehicle adapted to traverse uneven terrain, comprising:

a chassis;

first, second, third, and fourth wheel assemblies for supporting said chassis, each wheel assembly comprising a forward wheel and a rear wheel, and a support structure on which said forward wheel and said rear wheel are rotatably mounted, said support structure being pivotally supported on said chassis about a pivot axis located between said forward and rear wheels, said support structure of each wheel assembly being constructed and arranged such that vertical movement of one of the forward wheel and the rear wheel induces synchronous movement in the other of the forward wheel and the rear wheel;

said support structure for each wheel assembly being unbiased so as to permit free pivotal movement of each wheel assembly, each wheel assembly further comprising a limit means for limiting the free pivotal movement of the respective support structure to within a predetermined range.

28. The vehicle according to claim 27, wherein said limit means comprises a first stop member positioned adjacent to said support structure and a first actuator for moving said first stop member to a selected first location spaced from said pivot axis, whereby said first stop member engages said support structure and limits pivotal movement of the support structure in a first direction.

29. The vehicle according to claim 28, wherein said limit means further comprises a second stop member positioned adjacent to said support structure and a second actuator for moving said second stop member to a selected second location spaced from said pivot axis, whereby said second stop member engages said support structure and limits pivotal movement of the support structure in a second direction opposite to said first direction.

30. The vehicle according to claim 29, further comprising control means for simultaneously actuating the first actuators of the limit means to set pivotal limits for at least two of the first, second, third, and fourth wheel assemblies in the first direction and for simultaneously actuating the second actuators of the limit means to set pivotal limits for at least two of the first, second, third, and fourth wheel assemblies in the second direction.

* * * * *